(12) United States Patent
Zilberman et al.

(10) Patent No.: US 10,723,833 B2
(45) Date of Patent: *Jul. 28, 2020

(54) REACTIVE FLAME RETARDANTS FOR POLYURETHANE AND POLYISOCYANURATE FOAMS

(71) Applicant: ICL-IP AMERICA INC., Tarrytown, NY (US)

(72) Inventors: Joseph Zilberman, Haifa (IL); Andrew Piotrowski, Yorktown Heights, NY (US); Eran Gluz, Hod Hasharon (IL); Jeffrey Stowell, Wingdale, NY (US); Mark Gelmont, Haifa (IL); Zhihao Chen, Floral Park, NY (US); Mayank Singh, White Plains, NY (US)

(73) Assignee: ICL-IP America Inc., Tarrytown, NY (US)

( * ) Notice: Subject to any disclaimer, the term of this patent is extended or adjusted under 35 U.S.C. 154(b) by 89 days.

This patent is subject to a terminal disclaimer.

(21) Appl. No.: 15/773,635

(22) PCT Filed: Nov. 10, 2016

(86) PCT No.: PCT/US2016/061248
§ 371 (c)(1),
(2) Date: May 4, 2018

(87) PCT Pub. No.: WO2017/083471
PCT Pub. Date: May 18, 2017

(65) Prior Publication Data
US 2018/0319947 A1    Nov. 8, 2018

Related U.S. Application Data

(60) Provisional application No. 62/254,848, filed on Nov. 13, 2015.

(51) Int. Cl.
| | | |
|---|---|---|
| *C08G 18/76* | (2006.01) |
| *C08G 18/42* | (2006.01) |
| *C08G 18/48* | (2006.01) |
| *C08J 9/00* | (2006.01) |
| *E04B 1/78* | (2006.01) |
| *C08K 5/5313* | (2006.01) |
| *C07F 9/6571* | (2006.01) |
| *C08K 5/00* | (2006.01) |
| *C08G 18/38* | (2006.01) |
| *C08G 18/50* | (2006.01) |
| *C08K 5/06* | (2006.01) |
| *C07F 9/6568* | (2006.01) |
| *C08G 18/18* | (2006.01) |

(Continued)

(52) U.S. Cl.
CPC ........ *C08G 18/7671* (2013.01); *C07F 9/6568* (2013.01); *C07F 9/657172* (2013.01); *C08G 18/1825* (2013.01); *C08G 18/388* (2013.01); *C08G 18/4018* (2013.01); *C08G 18/42* (2013.01); *C08G 18/4208* (2013.01); *C08G 18/48* (2013.01); *C08G 18/4804* (2013.01); *C08G 18/5078* (2013.01); *C08G 18/7621* (2013.01); *C08G 18/7664* (2013.01); *C08J 9/0019* (2013.01); *C08J 9/0038* (2013.01); *C08J 9/125* (2013.01); *C08K 5/0066* (2013.01); *C08K 5/05* (2013.01); *C08K 5/06* (2013.01); *C08K 5/136* (2013.01); *C08K 5/53* (2013.01); *C08K 5/5313* (2013.01); *C09D 5/18* (2013.01); *C09D 175/08* (2013.01); *E04B 1/78* (2013.01); *E04B 1/80* (2013.01); *F16L 59/00* (2013.01); *F16L 59/14* (2013.01); *C08G 2101/0008* (2013.01); *C08G 2101/0016* (2013.01); *C08G 2101/0025* (2013.01); *C08G 2150/60* (2013.01); *C08G 2330/00* (2013.01); *C08J 9/141* (2013.01); *C08J 9/146* (2013.01); *C08J 2203/10* (2013.01); *C08J 2203/14* (2013.01); *C08J 2203/142* (2013.01); *C08J 2203/182* (2013.01); *C08J 2205/06* (2013.01); *C08J 2205/08* (2013.01); *C08J 2205/10* (2013.01); *C08J 2375/04* (2013.01); *C08J 2375/06* (2013.01); *C08J 2375/08* (2013.01); *G10K 11/162* (2013.01)

(58) Field of Classification Search
CPC ............ C08G 18/7671; C08G 18/5078; C08G 18/7664; C08G 18/7621; C08G 18/388; C08G 18/4804; C08G 18/42; C08G 18/4018; C08G 18/1825; C08G 18/48; C08G 18/4208; C08K 5/06; C08K 5/0066; C08K 5/5313; C08K 5/136; C08K 5/05; C08K 5/53; C07F 9/657172; C07F 9/6568; E04B 1/78; E04B 1/80; C08J 9/0019; C08J 9/125; C08J 9/0038; F16L 59/14; F16L 59/00; C09D 175/08; C09D 5/18

See application file for complete search history.

(56) References Cited

U.S. PATENT DOCUMENTS

| | | | | |
|---|---|---|---|---|
| 3,743,676 A * | 7/1973 | Smith et al. | ......... | C08K 5/5399 564/12 |
| 4,010,209 A | 3/1977 | Smith et al. | | |

(Continued)

*Primary Examiner* — Rabon A Sergent
(74) *Attorney, Agent, or Firm* — Dilworth & Barrese, LLP

(57) ABSTRACT

The present invention provides novel cyclic phosphorus-containing compounds, namely hydroxyl-functional phospholene-1-oxides, serving as highly efficient reactive flame retardants in urethane systems, particularly in flexible polyurethane foams, rigid polyurethane foams and rigid polyisocyanurate foams. The invention further provides fire-retarded polyurethane compositions comprising said hydroxyl-functional phospholene-1-oxides.

17 Claims, 2 Drawing Sheets

(51) Int. Cl.
  *C08G 18/40* (2006.01)
  *C08K 5/53* (2006.01)
  *C08J 9/12* (2006.01)
  *C08K 5/05* (2006.01)
  *C08K 5/136* (2006.01)
  *C09D 5/18* (2006.01)
  *C09D 175/08* (2006.01)
  *E04B 1/80* (2006.01)
  *F16L 59/00* (2006.01)
  *F16L 59/14* (2006.01)
  *C08G 101/00* (2006.01)
  *C08J 9/14* (2006.01)
  *G10K 11/162* (2006.01)

(56) References Cited

U.S. PATENT DOCUMENTS

| | | |
|---|---|---|
| 4,016,048 A | 4/1977 | Gehrmann et al. |
| 4,062,888 A | 12/1977 | Ohorodnik et al. |
| 4,102,949 A | 7/1978 | Schliebs et al. |
| 4,156,691 A | 5/1979 | Auer et al. |
| 4,221,874 A | 9/1980 | Moedritzer |
| 5,066,760 A | 11/1991 | Seidl et al. |
| 5,830,600 A | 11/1998 | Narang et al. |
| 6,087,423 A | 7/2000 | Kleiner et al. |
| 6,252,108 B1 | 6/2001 | Seitz |
| 6,270,560 B1 | 8/2001 | Kleiner et al. |
| 6,639,017 B1 | 10/2003 | Horold et al. |
| 6,797,754 B2 | 9/2004 | Yang et al. |
| 6,838,497 B2 | 1/2005 | Hong et al. |
| 2003/0130385 A1 | 7/2003 | Hong et al. |
| 2004/0162359 A1* | 8/2004 | Barber ............... C08G 18/225 521/159 |
| 2010/0113630 A1* | 5/2010 | Mark ................ C08G 18/6611 521/107 |
| 2014/0361230 A1 | 12/2014 | Kostler et al. |
| 2015/0252065 A1 | 9/2015 | Wehner |

* cited by examiner

Figure 1. Polyether foam scorch evaluation results
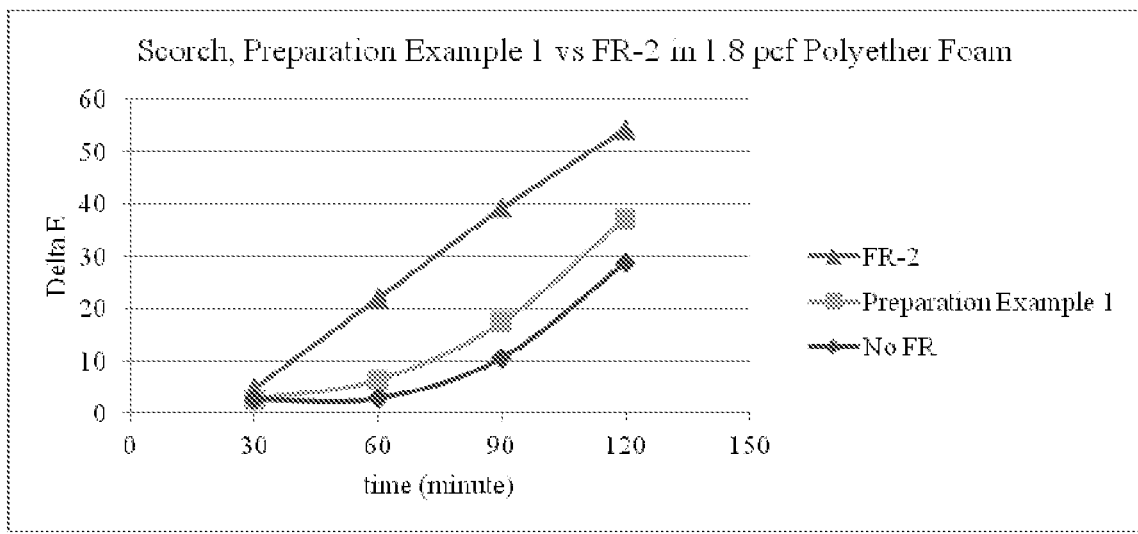
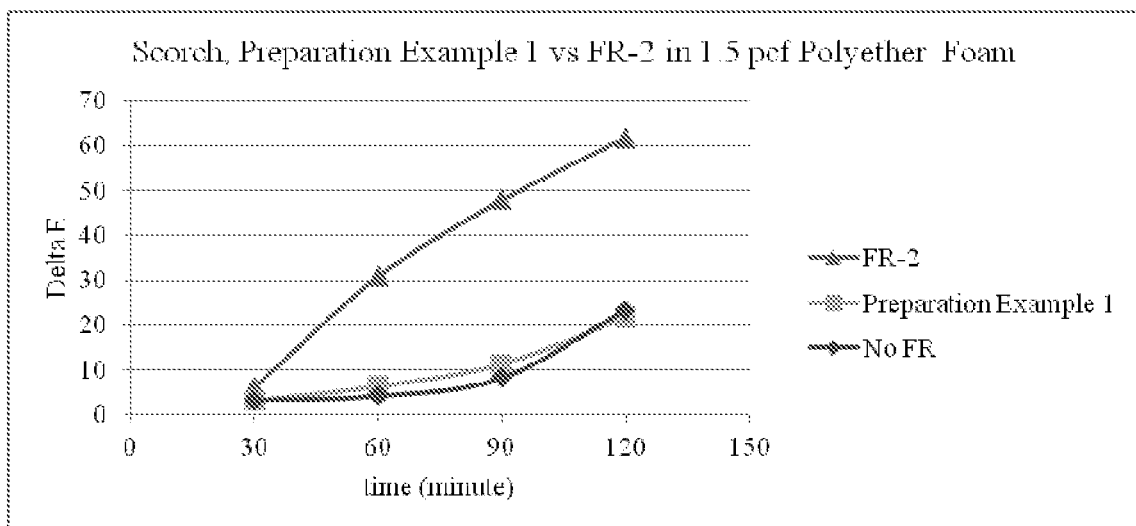

Figure 2. Polyester foam scorch evaluation results
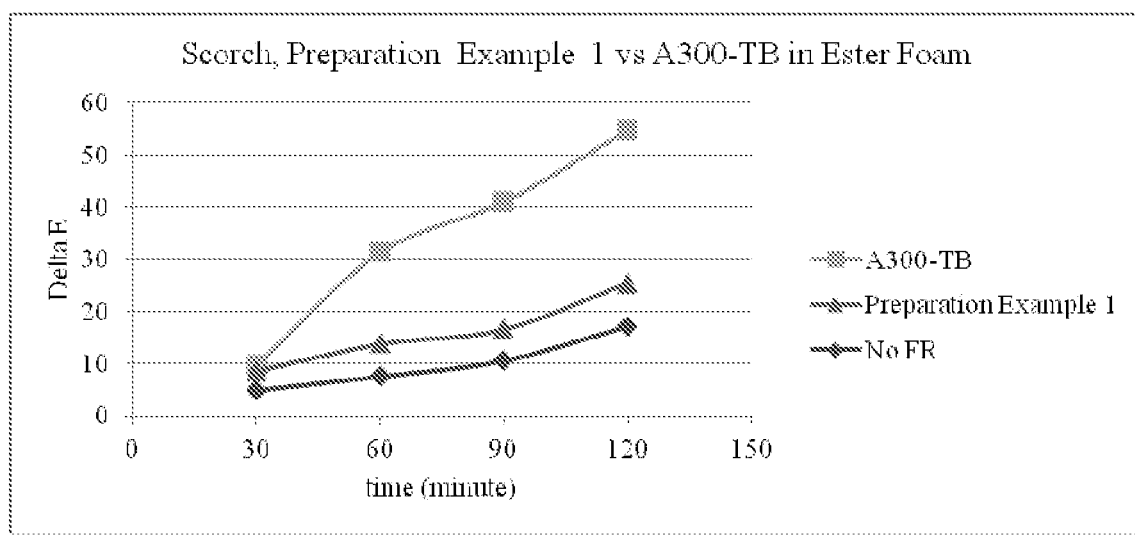

REACTIVE FLAME RETARDANTS FOR POLYURETHANE AND POLYISOCYANURATE FOAMS

This application claims priority to International Application No. PCT/US2016/061248 filed Nov. 10, 2016; which claims priority of U.S. Provisional Patent Application No. 62/254,848 filed Nov. 13, 2015, the entire contents of which are incorporated herein by reference in their entirety.

FIELD OF THE INVENTION

The disclosure herein provides for novel cyclic phosphorus-containing compounds, namely hydroxyl-functional phospholene-1-oxides, serving as highly efficient reactive flame retardants in urethane systems, particularly in flexible polyurethane foams, rigid polyurethane foams and rigid polyisocyanurate foams. The invention further provides fire-retarded polyurethane compositions comprising said hydroxyl-functional phospholene-1-oxides. The expressions "fire retardants" and "flame retardants" are used herein interchangeably.

BACKGROUND OF THE INVENTION

Brominated or phosphorus-based flame retardants are known to be highly effective and in many cases are the only options for reducing the fire risk of synthetic materials such as rigid or flexible polyurethane foams. However, the growing public and governmental scrutiny of chemicals, and in particular flame retardants, has increased over the years. The goal is towards more sustainable, reactive, polymeric and/or halogen-free new products. Scrutiny greatly diminishes if a flame retardant is reacted into the polymer matrix and cannot be leached-out.

Thus, there is a demand for reactive phosphorus-containing fire retardants for flexible polyurethane, rigid polyurethane and polyisocyanurate foams, possessing such features as high phosphorus content, clear light color and good compatibility with polyether polyols and polyester polyols employed in the polyurethane industry.

SUMMARY OF THE INVENTION

The present invention provides novel reactive phosphorus-containing hydroxyl-functional compounds possessing highly satisfactory flame-retarding characteristics and having good compatibility with the polyol components of a polyurethane system. The novel phosphorus-containing hydroxyl-functional compounds are fully reactive through their hydroxyl-functional group. This means that the flame retardants of the invention become integrated into the polymer substrate, for example a rigid or flexible foam, such that they are not released into the environment and are not likely to penetrate through cell membranes of living tissue, and therefore do not pose a health hazard. The invention further provides polyurethane compositions, including but not limited to polyurethanes and polyisocyanurate compositions containing the said novel reactive phosphorus-containing hydroxyl-functional compounds that exhibit excellent fire retardancy.

The term "foam" as used herein refers to polyurethane foams, which in turn can comprise, any one or more of flexible, semi-rigid, and rigid polyurethane foams or polyisocyanurate foams. The term "polyurethane" as described herein can encompass both polyurethane materials and polyisocyanurate materials. The polyurethane and/or polyisocyanurate described herein, or claimed herein, as comprising, consisting essentially of or consisting of the hydroxyl-functional phospholene-1-oxide compounds of the general formula (I-A) and (I-B), and the group of novel phosphorus-containing polyol reaction products of the partial phosphorylation of polyalcohols, which contains at least one phosphorus-containing group of the general formula (I-B), are all understood herein to contain the aforementioned formula(e) as reactive materials, i.e., the aforementioned formula(e) are reacted into the polyurethane and/or polyisocyanurate material's structure, in which case the aforementioned formula(e) may not be present, or would not be present in the same structural formula(e) as described herein, but would be present in the polyurethane and/or polyisocyanurate material as a reaction product of a polyol, a polyisocyanate and the structural formula(e) described herein.

The present invention provides novel hydroxyl-functional phospholene-1-oxide compounds of the general formula (I-A) and (I-B), and a group of novel phosphorus-containing polyol reaction products of the partial phosphorylation of polyalcohols, which contains at least one phosphorus-containing group of the general formula (I-B), wherein formula (I-A) is:

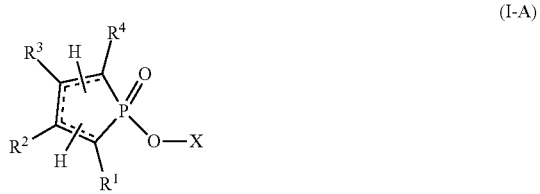

(I-A)

wherein:

the dashed line indicates a double bond located between the carbon atom at position 3 and one of the carbon atoms at positions 2 and 4 provided that each of the two ring carbon atoms which are not part of the double bond are each bonded to one of the two hydrogen atoms shown in the structural formula (I-A), $R^1$, $R^2$, $R^3$ and $R^4$ are independently selected from H, a linear or branched alkyl group containing from 1 to 4 carbon atoms, preferably methyl or ethyl; or chlorine, and X is either ------ $(Z)_k$—$R^7$ or

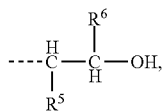

and when X is Z is ------ $(Z)_k$—$R^7$, Z is —(Y—O)$_n$—, wherein Y is a linear or branched alkylene group containing from 2 to 8 carbon atoms, preferably from 2 to 4 carbon atoms, more preferably ethylene, propylene, or isopropylene, and n represents an integer from 1 to 20, preferably from 1 to 5, k may be 0 or 1;

$R^7$ is selected from hydrogen, a hydroxy-terminated linear or branched alkylene group containing from 2 to about 8 carbon atoms, preferably from 2 to 4 carbon atoms; and, provided that when k is zero, $R^7$ is the hydroxy-terminated linear or branched alkylene group and when k is 1, $R^7$ is hydrogen, and when X is

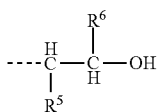

$R^5$ and $R^6$ are each independently selected from H, a linear or branched alkyl group containing from 1 to 8 carbon atoms, preferably from 1 to about 4 carbon atoms and most preferably any one of methyl, ethyl or propyl, a linear or branched alkenyl group containing from 2 to 8 carbon atoms, preferably from 2 to about 4 carbon atoms, a hydroxyalkyl group containing from 2 to 4 carbon atoms, a halo-substituted alkyl group containing from 1 to 8 carbon atoms, an alkoxy group containing from 1 to 8 carbon atoms, preferably from 1 to about 4 carbon atoms, an aryl group containing from 6 to 12 carbon atoms, preferably from 6 to about 8 carbon atoms, and an alkylaryl group containing from 7 to 16 carbon atoms, preferably from 7 to about 12 carbon atoms, or $R^5$ and $R^6$ are bonded to each other to form a cycloalkyl group containing from 5 to about 8 carbon atoms, preferably 6 carbon atoms; and wherein formula (I-B) is:

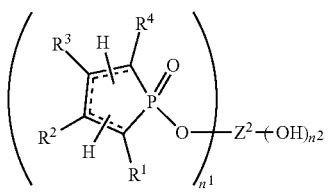

wherein:

the dashed line indicates a double bond located between the carbon atom at position 3 and one of the carbon atoms at positions 2 and 4, provided that each of the two ring carbon atoms which are not part of the double bond are each bonded to one of the two hydrogen atoms shown in the structural formula (I-B);

$R^1$, $R^2$, $R^3$ and $R^4$ are independently selected from H, a linear or branched alkyl group containing from 1 to 4 carbon atoms, preferably methyl or ethyl; or chlorine, each of $n^1$ and $n^2$ is an integer equal to or greater than 1, preferably each of $n^1$ and $n^2$ is from about 1 to about 5, with $n^1+n^2$ being equal to or greater than 3, preferably from about 3 to about 5 and $Z^2$ is a moiety derived from a branched polyol which has a valence of $n^1+n^2$, and is of the general formula:

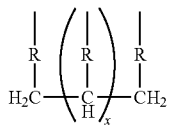

wherein R is selected from the group consisting of:

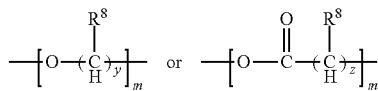

and where each $R^8$ is H or is an alkyl of from 1 to 4 carbon atoms, x is ≥1, preferably from 1 to about 4, y is 2 or 3; z is an integer of from 2 to 5; and, m≥1, preferably m is 1.

There is also provided herein a process for the preparation of said novel compounds.

The novel compounds of formula (I-A) can be prepared by the reaction of 1-hydroxy-phospholene-1-oxides of formula (II) with compounds having an oxirane group, wherein formula (II) is:

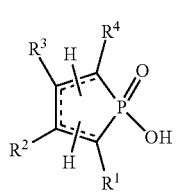

wherein $R^1$, $R^2$, $R^3$ and $R^4$ are as defined, and the dashed line indicates a double bond located between the carbon atom at position 3 and one of the carbon atoms at positions 2 and 4, provided that each of the two ring carbon atoms which are not part of the double bond are each bonded to one of the two hydrogen atoms shown in the structural formula (II), The novel compounds of formula (I-A) can also be prepared by the reaction of 1-halo-phospholene-1-oxides of formula (III) with aliphatic diols, wherein formula (III) is:

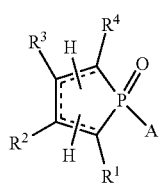

wherein $R^1$, $R^2$, $R^3$ and $R^4$ are as defined and the dashed line indicates a double bond located between the carbon atom at position 3 and one of the carbon atoms at positions 2 and 4, provided that each of the two ring carbon atoms which are not part of the double bond are each bonded to one of the two hydrogen atoms shown in the structural formula (III), and A is chlorine or bromine, The novel phosphorus-containing polyols of the invention, for example those of Formula I-B, can be prepared by the reaction of 1-halo-phospholene-1-oxides of formula (III) with aliphatic polyols.

The reactive substituted hydroxyl-functional phospholene-1-oxides of this invention possess high phosphorus content, have good hydrolytic and thermal stability, exhibit good compatibility with the polyol components of the polyurethane system, and are useful as highly efficient reactive flame retardants in flexible and rigid polyurethane and polyisocyanurate foams.

The present invention further provides fire-retarded polyurethane compositions comprising said novel phosphorus-containing hydroxyl-functional compounds which can be used either individually or in an admixture with one another or with other flame retardants, including bromine-containing flame retardants and phosphorus-containing flame retardants.

All the above and other characteristics and advantages of the invention will be better understood through the following illustrative and non-limitative detailed description of the preferred embodiments thereof.

BRIEF DESCRIPTION OF THE DRAWINGS

FIG. 1 contains two graphs illustrating the indicative scorch performance of Preparation Example 1 in comparison to the known commercial product Fyrol FR-2 and foam made without an FR additive in two polyether foam densities FIG. 2 is a graph illustrating the indicative scorch performance of Preparation Example 1 in comparison to the known commercial product Fyrol FR-2 and foam made without an FR additive in polyester foam

DETAILED DESCRIPTION OF PREFERRED EMBODIMENTS

In one embodiment the hydroxyl-functional phospholene-1-oxides of formula I-A can be those of the more specific formulae I-A-1 or I-A-2, wherein formula I-A-1 is:

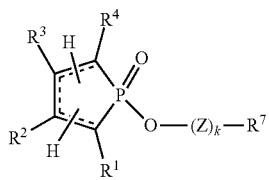
(I-A-1)

wherein $R^1$-$R^4$, Z, k, $R^7$ and the dashed line are as defined above; and,
wherein formula I-A-2 is:

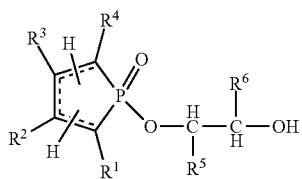
(I-A-2)

and wherein $R^1$-$R^6$ and the dashed line are as defined above.

The hydroxyl-functional phospholene-1-oxides of formula (I-A) of the present invention are prepared by the reaction of 1-hydroxy-phospholene-1-oxides of formula (II) with compounds of formula (IV), having oxirane groups, which formula (IV) is

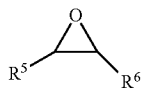
Formula (IV)

wherein:
$R^5$ and $R^6$ are as defined above.

The hydroxyl-functional phospholene-1-oxides of formula (I-A) of the present invention are prepared by the reaction of 1-halo-phospholene-1-oxides of formula (III) with aliphatic diols of formula (V):

$$HO-(Z)_K-R^7 \qquad (V)$$

wherein Z, $R^7$ and the subscript k are as defined above.

The phosphorus-containing polyols of the present invention, for example those of formula I-B, are prepared by the reaction of 1-halo-phospholene-1-oxides of formula (III) with aliphatic polyols.

The non-substituted and substituted 1-hydroxy-phospholene-1-oxides (II) and 1-chloro-phospholene-1-oxides (III) employed as starting materials in the process of the present invention are for the most part well known in the art. The compounds of formula (II) can be obtained for example by hydrolysis of the corresponding 1-halo-phospholene-1-oxides (III). The latter can be prepared for example by the method described in CA 2040603, the contents of which are incorporated by reference herein.

Specific oxirane compounds used in the process for preparing the compounds of formula (I-A) or more specifically (I-A-1) or (I-A-2) of the present invention are selected from the group consisting of, but not limited to, for example, ethylene oxide, propylene oxide, 1,2-epoxybutane, 1,2-epoxypentane, 1,2-epoxyhexane, 1,2-epoxy-5-hexene, 1,2-epoxy-2-methylpropane, 1,2-epoxyoctane, glycidyl methyl ether, glycidyl isopropyl ether, glycidyl isobutyl ether, glycidyl heptyl ether, glycidyl 2-ethylhexyl ether, glycidyl allyl ether, trimethylolpropane triglycidyl ether, styrene oxide, cyclohexene oxide, epichlorohydrin and combinations thereof. More preferably, ethylene oxide, propylene oxide and 1,2-epoxybutane are used as the oxirane compound.

Specific aliphatic diols used in the process for preparing the compounds of formula (I-A) or more specifically (I-A-1) or (I-A-2) of the present invention are selected from the group consisting of, but not limited to, for example, ethylene glycol, diethylene glycol, triethylene glycol, propylene glycol, dipropylene glycol, tripropylene glycol, 1,3-propane diol, 1,4-butane diol, 2-butene-1,4-diol, 1,5-pentane diol, 1,6-hexane diol, 1,8-octane diol, and other diols having molecular weights up to 700.

The aliphatic polyols used in the process for preparing the phosphorus-containing polyols of the invention can generally be any suitable polyols having at least three reactive hydrogen atoms, examples being those having functionality of from 3 to 6, preferably 3 and 4, and preferably a molecular weight of from about 100 to about 700. Specific aliphatic polyols can be selected from the group of non-polymeric polyalcohols, for example, trimethylol propane, trimethylol ethane or glycerol.

Preferably, the polyols to be used according to the present invention are polyether polyols. This class of polyols is obtained by the ring-opening addition reaction of one or more alkylene oxides (e.g., ethylene oxide and propylene oxide) with a suitable reactant containing active hydrogen atoms, such as alcohols, amine and acids; more specifically, said reactant may be selected from a group consisting of triols, novolac resins, pentaerythritol, sorbitol, sucrose, diethylenetriamine and the like. Polyester-polyols may also be used according to the present invention; this class of polyols is obtained by the condensation reaction of dicarboxylic (or polycarboxylic) acid, such as adipic acid, phthalic acid or the like, with triols. The aliphatic polyols used in the process for preparing the phosphorus-containing polyols of the present invention are selected from polymeric polyols such as polyether polyols, polyester polyols, and mixtures thereof.

In a preferred embodiment of the present invention, the reaction of 1-hydroxy-phospholene-1-oxides (II) with an oxirane compound is carried out in a medium of excess oxiranes, with or without an organic solvent such as isopropanol, 1,4-dioxane, or toluene.

The amount of oxirane compound used in the reaction with 1-hydroxy-phospholene-1-oxides (II) is a 5-300% molar excess relative to the 1-hydroxy-phospholene-1-oxide, and preferably a 50-100% molar excess. Using a molar excess of the oxirane compound greater than 100% relative to the 1-hydroxy-phospholene-1-oxide is inexpedient due to the need to recycle a large quantity of oxirane.

The hydroxyl-functional phospholene-1-oxides of formula (I-A) or more specifically (I-A-1) or (I-A-2) of the present invention have a phosphorus content of about 8-18% by weight and a hydroxyl number of about 150-315 mg KOH/g, depending on the 1-hydroxy-phospholene-1-oxide and the oxirane taken for the reaction.

It is preferred, for the preparation of the target hydroxyl-functional phospholene-1-oxides (I-A) or more specifically (I-A-1) or (I-A-2) with the highest possible phosphorus content, to react non-substituted or methyl-substituted 1-hydroxy-phospholene-1-oxides having the highest phosphorus content amongst the 1-hydroxy-phospholene-1-oxides (II), with ethylene oxide and propylene oxide.

Thus, the compounds of formula (I-A) or more specifically (I-A-1) or (I-A-2), having particularly valuable properties are those wherein $R^1$, $R^3$ and $R^4$ are each hydrogen, $R^2$ is H or methyl, $R^5$ and $R^6$ are each independently selected from H, or $R^5$ and $R^6$ and methyl, providing that when $R^5$ is methyl, $R^6$ is hydrogen, and when $R^6$ is methyl, $R^5$ is hydrogen.

Said reactions are carried out at a temperature of between 40° C. and 120° C., and preferably between 70° C. and 90° C. At a temperature lower than 40° C. the reaction becomes unacceptably slow. On the other hand, applying a temperature higher than 120° C. is not advisable since at such temperatures undesirable decomposition products may be formed.

In a preferred embodiment, the reaction of 1-halo-phospholene-1-oxides (III) with an aliphatic diol is carried out in a medium of excess diol.

The amount of diol compound used in the reaction with 1-halo-phospholene-1-oxides (III) is generally a 2 to 10 moles per 1 mole 1-halo-phospholene-1-oxide, and preferably a 4 to 8 moles molar excess. The relatively large excessive amounts of these diols are required for minimizing the formation of undesirable di-phospholene phosphinic acid esters of glycols and diols having no hydroxyl groups. Using a molar excess of the diol compound greater than 10 moles per 1 mole 1-halo-phospholene-1-oxide is inexpedient due to the need to recycle a large quantity of diol.

The hydroxyl-functional phospholene-1-oxides of formula (I-A) or more specifically (I-A-1) or (I-A-2) of the present invention have a phosphorus content of about 2-18% by weight and a hydroxyl number of about 150-450 mg KOH/g, depending on the 1-halo-phospholene-1-oxide and the diol taken for the reaction.

It is preferred, for the preparation of the target hydroxyl-functional phospholene-1-oxides (I-A) or more specifically (I-A-1) or (I-A-2) with the highest possible phosphorus content, to react non-substituted or methyl-substituted 1-chloro-phospholene-1-oxides having the highest phosphorus content amongst the 1-halo-phospholene-1-oxides (III), with ethylene glycol.

Thus, the compound of formula (I-A-1) having particularly valuable properties, is that wherein $R^1$, $R^3$ and $R^4$ are each hydrogen, $R^2$ is methyl, Y is —$CH_2CH_2$—, n is 1 and $R^7$ is hydrogen.

Said reactions are carried out at a temperature of between 25° C. and 120° C., and preferably between 50° C. and 90° C. Applying a temperature lower than 25° C. results in a low yield. On the other hand, applying a temperature higher than 120° C. is not advisable since at such temperatures undesirable decomposition products may be formed. In addition a catalyst can be used to accelerate reaction for example $MgCl_2$ or $ZnCl_2$.

In a preferred embodiment the reaction of 1-halo-phospholene-1-oxides (III) with an aliphatic diol is carried out in the presence of a strong base such as sodium hydroxide or potassium hydroxide, in a medium of both an organic solvent and an excess aliphatic alcohol. The organic solvent is selected from aromatic compounds. Especially suitable aromatic solvents are chlorobenzene, ortho-dichlorobenzene, mesitylene, and in particular, toluene and xylene. An effective amount of the base employed in the process is in a range of 1-1.2 mol per 1 mol 1-halo-phospholene-1-oxides (III), and preferably 1-1.05 mol.

Sodium or potassium hydroxide can be employed in a solid form. Water resulting from the reaction between the diol and the base should be eliminated from the reaction mixture as much as possible prior to the addition of 1-halo-phospholene-1-oxides (III).

In a preferred embodiment, the reaction of 1-halo-phospholene-1-oxides (III) with an aliphatic polyol is carried out by varying the degree of partial phosphorylation of the polyol. The phosphorus-containing polyol according to the present invention comprises at least one phosphorus-containing group. This phosphorus-containing group is a group of formula (M-A).

(III-A)

wherein:
wherein $R^1$, $R^2$, $R^3$ and $R^4$ are as defined and the dashed line indicates a double bond located between the carbon atom at position 3 and one of the carbon atoms at positions 2 and 4, provided that each of the two ring carbon atoms which are not part of the double bond are each bonded to one of the two hydrogen atoms shown in the structural formula (III), and wherein the wavy line indicates a bond to a diol or polyol via an oxygen atom.

The phosphorus-containing polyol of the invention can also comprise two or more phosphorus-containing groups of formula (III-A), wherein these phosphorus-containing groups can be identical or different.

The reaction of 1-halo-phospholene-1-oxides (III) with an aliphatic polyol can be carried out in the presence of an organic base which is selected from, but not limited to, the group of tertiary amines, for example, triethylamine, pyridine, diisopropyl ethyl amine, 1-methylimidazole. The amount of base used is equimolar to 1-halo-pholene-1-oxide (III). The base can also be used in excess to the 1-halo-pholene-1-oxide. Said reactions are typically carried out in a medium of inert organic solvent. Suitable solvents for the phosphorylation are, but not limited to, halogenated hydrocarbons, such as methylene chloride, chloroform or 1,2-dichloroethane. Solvents which are further suitable are ethers such as dioxane or tetrahydrofuran. Solvents which are further suitable are hydrocarbons such as hexane or toluene.

In a preferred embodiment the reaction of 1-halo-phospholene-1-oxides (III) with an aliphatic polyol is carried out in the presence of a strong inorganic base such as sodium hydroxide or potassium hydroxide, in a medium of an organic solvent such as chlorobenzene, mesitylene, and in particular, toluene and xylene.

An effective amount of the base employed in the process is in a range of 1-1.2 mol per 1 mol 1-halo-phospholene-1-oxides (III), and preferably 1-1.05 mol.

Sodium or potassium hydroxide can be employed in a solid form. Water resulting from the reaction between the polyol and the base should be eliminated from the reaction mixture as much as possible prior to the addition of 1-halo-phospholene-1-oxides (III).

The amounts of 1-halo-phospholene-1-oxide (III) and polyol can be adjusted so that the desired degree of functionalization is attained. Partial phosphorylation of the polyol can be achieved by using less than the stoichiometric amount of the 1-halo-phospholene-1-oxide (III) to the polyol based on its functionality. In this way, only a portion of the OH groups in the polyol is reacted with 1-halo-phospholene-1-oxide.

The phosphorus-containing polyol of the present invention has an OH-functionality of from 1 to 5, preferably 2, 3 or 4, and a molecular weight of from about 200 to about 1000. The phosphorus-containing polyols of the present invention have a phosphorus content of about 4-12% by weight and a hydroxyl number of about 20-800 mg KOH/g, depending on the 1-halo-phospholene-1-oxide and the polyol taken for the reaction, and on the molar ratio between them.

The polyol phosphorylation reactions are carried out at a temperature of between 0° C. and 100° C., and preferably between 10° C. and 90° C. Applying a temperature lower than 0° C. results in a low reaction rate. On the other hand, applying a temperature higher than 100° C. is not advisable since at such temperatures undesirable decomposition products may be formed.

The following examples illustrate specific embodiments of both the preparation of certain compounds of the invention and the utility of these compounds as flame retardants in flexible polyurethane foams, rigid polyurethane foams, polyisocyanurate foams, coatings, adhesives and elastomers.

The novel compounds of the invention are useful as flame retardants. The new flame retardants may be used as-is, or as a mixture with halogenated or non-halogenated products. More preferable are compositions of the new hydroxyl-functional phospholene-1-oxides with reactive brominated products containing a hydroxyl-group. For rigid polyurethane (PU) foams it is preferred to use a mixture with a brominated product, and for polyisocyanurate (PIR) foams, it is preferred to use a pure product. For flexible PU foams it is preferred to use pure halogen-free hydroxyl-functional phospholene-1-oxides of the invention.

A preferred brominated flame retardant to be used according to the present invention in combination with hydroxyl-functional phospholene-1-oxides, comprises one or more tribromophenol-terminated compounds represented by Formula (VI)

Formula (VI)

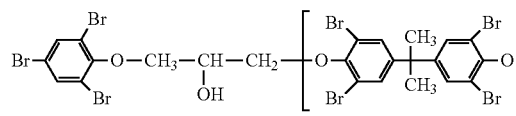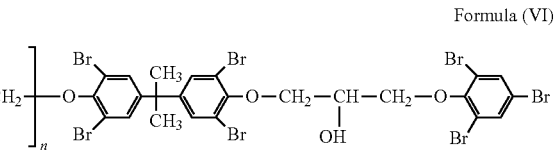

wherein:

n is an integer in the range between 0 and 5, and more preferably in the range between 0 and 4.

Such compounds can also be successfully dissolved in hydroxyl-functional phospholene-1-oxides, the liquid composition provided by the present invention, without altering the stability of the composition, such that the resulting composition retains the form of a solution at ambient temperature over a long storage period. A commercially available tribromophenol-terminated compound of formula (VI) is produced by Dead Sea Bromine Group under the trade name F-3014.

The weight concentration of the hydroxyl-functional phospholene-1-oxides relative to the total weight of the composition is preferably between 10 and 60%, and more preferably between 20 and 40%.

It has also been found that tribromoneopentyl alcohol, a flame-retarding agent represented by the structure of Formula (VII):

(Formula VII)

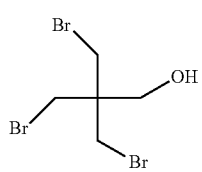

which is solid at room temperature, can also be successfully dissolved in hydroxyl-functional phospholene-1-oxides, the liquid composition provided by the present invention, without altering the stability of the composition, such that the resulting composition retains the form of a solution at ambient temperature over a long storage period. Preferably, the weight concentration of tribromoneopentyl alcohol is in the range between 10 and 60%, and more preferably in the range between 20 and 40%, relative to the total weight of the composition. Tribromoneopentyl alcohol is commercially available from Dead Sea Bromine Group under the trade name FR-513.

The novel composition of the present invention is particularly useful as a flame retardant for polyurethane and polyisocyanurate foams. As explained above, the liquid composition provided by the present invention is a solution that contains the hydroxyl-functional phospholene-1-oxides of Formula (I-A, or more specifically (I-A-1) or (I-A-2)) or (I-B) in combination with the compound of Formula (VI), or separately with tribromoneopentyl alcohol (VII), and preferably as a solute of the hydroxyl-functional phospholene-1-oxides of Formulae (I-A, or more specifically (I-A-1) or (I-A-2)) or (I-B) with both the compounds of Formula (VI) and Formula (VII), and may therefore be directly added to the liquid mixture of reactants used for preparing polyurethane and polyisocyanurate foams, whereby the blending operation of said mixture is considerably simplified and a uniform distribution of the components to be reacted is readily obtained in said mixture.

In another embodiment herein the brominated flame retardant is selected from the group consisting of brominated bisphenol A compounds, brominated bisphenol S compounds, brominated bisphenol F compounds, brominated bisphenol A carbonate oligomers, brominated bisphenol A epoxy resins, end-capped brominated bisphenol A epoxy resin, aliphatic brominated alcohols and glycols, dibromoneopentyl glycol, brominated phthalates and tetrabromophthalate diols, brominated phosphates, brominated phenols, brominated phthalic acids, and combinations thereof.

The amount of the brominated flame retardant to be used according to the present invention varies depending on the relationship between the extent of the flame retardation required of polyurethane foam and physical properties. However, the brominated flame retardant is usually used in an amount of 1 to 50 parts by weight based on 100 parts by weight of polyurethane foam. In an amount less than 1 part by weight, desired flame retardancy cannot be imparted. Amounts exceeding 50 parts by weight bring about sufficient flame retardancy but may impair the physical properties of the molded or formed product of the resulting foam. Amounts outside the above-described range are therefore not preferred. From the viewpoint of keeping good balance between the flame retardancy and physical properties, the amount practically falls within a range of 3 to 30 parts. Depending on the end use application, two or more brominated flame retardants can be used in combination.

Thus, the new flame retardant compositions of the present invention may be used as preformed concentrates that can be added to standard formulations suitable for obtaining rigid polyurethane foams (by continuous, discontinuous or spray methods) or polyisocyanurate foams.

In another aspect, the present invention provides a composition of the novel hydroxyl-functional phospholene-1-oxides (I-A) or more specifically (I-A-1) or (I-A-2) or I-B with either halogenated or non-halogenated products (or both).

The weight ratio between the compound of Formula (I-A-1) or (I-A-2) out of general formula I-A and the other products in the flame-retardant composition of the invention is between 1:9 and 9:1, and more preferably between 30 and 70%. The brominated flame retardants, for example tribromoneopentyl alcohol (FR-513) and tribromophenol-terminated compounds represented by Formula (VI), may be included in the composition of the invention, such that the weight concentrations of the hydroxyl-functional phospholene-1-oxides of the invention, tribromoneopentyl alcohol (VII) and tribromophenol-terminated compounds represented by Formula (VI) in the flame-retardant composition of the invention, are in the ranges from 10 to 50 wt %, 10 to 50 wt % and 10 to 50 wt %, respectively.

The novel compounds of the present invention are highly efficient flame retardants when incorporated into rigid, semi-rigid, or flexible polyurethane foams, polyisocyanurate (PIR) foams, polyurethane coatings, polyurethane adhesives and polyurethane elastomers. It should be noted that the compounds of the invention are useful over a broad Isocyanate Index (abbreviated herein MDI or TDI). The index refers to the ratio of isocyanate practically used in the formulation vs. the theoretical stoichiometric amount of isocyanurate required, expressed in percentages.

The rigid or semi-rigid polyurethane or polyisocyanurate foams contain a typical flame retardant amount of the composition of this invention. Typically, the compositions of this invention are used in amounts providing a total phosphorus concentration in the polymer in the range of 0.3 to 15 wt %, based on the total weight of the polymer. Preferably, the total phosphorus concentration in the polymer is in the range 1 to 10 wt %, and more preferably in the range of 2 to 5 wt %, based on the total weight of the polymer. Most preferably, the amounts used of the flame retardants of this invention are at least sufficient to meet the current requirements of the DIN 4102 B2 test.

The flexible polyurethane foams contain a typical flame retardant amount of the composition of this invention. Typically, the compositions of this invention are applied in amounts that provide a total phosphorus concentration in the polymer in the range of 0.3 to 15 wt %, based on the total weight of the polymer. Preferably, the total phosphorus concentration in the polymer is in the range of 1 to 10 wt % and more preferably, in the range of 1.5 to 5 wt %, based on the total weight of the PU polymer. Most preferably, the amounts used of the flame retardants of this invention are at least sufficient to meet the current requirements of the flammability Test Method MVSS 302.

By suitable choice of components and conditions, foams are made which vary in properties from the soft flexible type used in upholstery applications to the hard rigid type used as insulation/structural members. Thus, flexible foams are generally made from polymeric diols or triols having hydroxyl numbers of from 20 to 80 using water as the principal foaming agent. The much higher crosslink density required in rigid foams is provided by the use of higher functionality polyols and/or polyisocyanates and here the principal foaming agent is usually a halogenated hydrocarbon such as trichlorofluoromethane.

Between the extremes of flexibility on the one hand and rigidity on the other, there exists another useful type of foam generally classified as semi-rigid. These foams, which are used as shock-absorbing materials in the passenger compartments of automobiles and elsewhere, are usually made by reacting a polyisocyanate with a mixture of a flexible foam polyol and a crosslinking agent such as trimethylolpropane.

Whilst the production of all polyurethane foams, flexible, rigid or semi-rigid, involves the same basic chemical reaction, that between isocyanate groups and hydroxyl groups, each type of foam presents different problems to the manufacturer. The differences are often associated with the balance which must always be achieved between gas generation and polymer gelation. Clearly, for example, the balance in a water-blown flexible foam system is different from that in a solvent-blown highly crosslinked rigid foam system. Many of these problems can be solved, at least partially, by appropriate choice of auxiliary agents, for example catalysts, surfactants, foam stabilizers and the like.

Flexible polyurethane foams as used herein is made using a polyol having a 3,000 to about 6,000 molecular weight polyol as described herein, e.g., a polyether triol prepared by the addition of propylene oxide to glycerol. A flexible polyurethane foam as used herein is characterized by having a core impact resilience of at most 30% and a glass transition point of from −80° C. to −60° C. Here, the flexible polyurethane foam preferably has a hard segment content of at most 40 mass %. Conventional flexible polyurethane foam having a bulk foam density of 2.5 pounds per cubic foot (PCF) or lower and having a foam hardness or IFD (measured in accordance with test method ASTM 3574-Test B1) in a range of 10 to 90 lb/50 in$^2$.

Rigid polyurethane foam as used herein is made from more highly branched, lower equivalent weight polyether polyols with functionalities as high as 8. In a rigid polyurethane foam a higher concentration of aromatic polyisocyanate is needed than in a flexible foam. A rigid polyurethane foam obtainable by the method of the present invention preferably has a core density of from 10 to 50 kg/m$^3$, more preferably from 20 to 40 kg/m$^3$.

Rigid foams have been used in the auto and other industries for a number of purposes. For example, rigid foams have been used for structural reinforcement, preventing corrosion and damping sound and vibration. These foams are typically formed by applying a reactive foam formulation to a part and allowing the formulation to foam in place. The part is often already assembled onto a vehicle when the foam is applied. This means that the foam formulation must be easy to mix and dispense, must cure rapidly before it runs off the part, and preferably initiates curing at moderate temperatures. To minimize worker chemical exposure, the formulation is preferably is low in volatile organic compounds, especially volatile isocyanates and amines. The individual components are preferably storage-stable at room temperature for an extended period.

The term semi-rigid as applied to foams is a standard term used in the art. Generally such foams have a glass transition temperature (Tg) between rigid and flexible foams.

The compositions of the invention can be combined with the polyol component and/or the polyisocyanate component or catalyst and one or more of the flame retardant materials of Formulae (IA), (I-A-1), (I-A-2) and (I-b) described herein which may be metered and pumped into a common mixing vessel, and then the resulting mixture may be easily be moved to the polymerization site for use in molds, slab stock operations, etc.

The compositions of the invention herein may also be admixed with the polyol reactant before it is combined with the polyisocyanate reactant. It is also within the scope of the invention to mix the flame retardant materials with the polyisocyanate before combining such mixture with the polyol reactant. However, if the polyisocyanate and the aforementioned flame retardant materials are mixed and allowed to stand at room temperature for a substantial period of time, reaction may occur.

The flame retardant materials of Formulae (IA), (I-A-1), (I-A-2) and (I-b) described herein may be described as isocyanate-reactive (NCO-reactive) materials, i.e., they are reactive with the isocyanates through the hydroxyl group(s).

The polyols used in making the polyurethane foams and/or polyisocyanurate foams described herein (be they, flexible, semi-rigid or rigid) can include any organic polyol, including diols, polyols, and polyether, polyester, polyesteramide polyols having hydrogen atoms that are reactive with isocyanates may be used. Generally, these materials have molecular weights ranging from about 62 to about 5,000 and have from 2 to more hydroxyl groups per molecule and weight percent hydroxyl contents ranging from about 0.5 to about 25%. The generally have hydroxyl numbers of from about 50 to as high as 500 or even 700.

In the polyester-polyol type of reactant the acid number should be less than 10 is usually as close to 0 as possible. These materials are referred to conveniently as the "polyol" reactant. The useful active hydrogen-containing polyols include the large family of adduct compounds which result when ethylene oxide, propylene oxide, 1,2- and 2,3-butylene oxide, or other alkylene oxides are added to such active hydrogen compounds such as glycols and polyols presented by ethylene glycol, propylene glycol, glycerine, methyl glucoside, sucrose, sorbitol, hexanetriol, trimethylol propane, pentaerythritol as well as various alkylamines and alkylenediamines, and polyalkylenepolyamines and the like. Various amounts of these alkylene oxides may be added to the based polyol or amine molecules referred to, depending upon the intended use of the polyurethane. For example, when a final polyurethane is desired which is flexible, one would use more alkylene oxide than for a more rigid polyurethane.

For example, a polyol for use in making flexible foams could be well represented by glycerine to which sufficient propylene oxide was added to give a final hydroxyl content of about 1.7%. Such a material would have a molecular weight of about 3,000 and have a molar ratio of glycerine to propylene oxide of about 1 glycerine to 50 propylene oxide. This technique of controlling rigidity or flexibility by selection of the polyol molecule and the subsequent amount of alkylene oxide added is well known to those in the art.

In addition to the glycols and the like which can serve as the base polyol molecule for addition of the alkylene oxides and thus yield the "polyol" molecule for reaction with the isocyanate, one can use a starting molecule which contains primary and/or secondary amine groups which have hydrogen reactive toward alkylene oxides. Here also, the quantity of alkylene oxide added depends on the intended uses of the final polyurethane products. Again, for flexible products where more alkylene oxide would be used to product polyols with lower hydroxyl content, such as from about 0.1% to about 5% or 10%, than for more rigid polyurethanes wherein polyols having weight percent hydroxyl content of from about 10% to about 15% or 20%, typically, 10% to 12%, are often used.

Representative amines which may serve as active-hydrogen containing molecules for reaction with epoxides are those having from 1 to about 6 or more amino nitrogens, examples of which are ethyl amine, ethylene diamine, diethylenetriamine, triethylenetetramine, tetrapropylenepentamine and other linear saturated aliphatic alkylene amines, the important requirement being at least two, and preferably more, say 3 to 8 or 10 active hydrogen sites to which the alkylene oxide may be added.

It is also well known to use the hydroxyl bearing molecules which have been prepared by esterification type reactions from polyfunctional acids or anhydrides and polyfunctional alcohols as the active hydrogen compounds used in preparing the polyurethane systems. These compounds are often called polyester polyols. Typical acids used in making these polyester polyols are maleic, phthalic, succinic, fumaric, tetrahydrophthalic, chlorendic, and tetrachlorophthalic acids. Typical polyols are ethylene, propylene, butylene, diethylene, and dipropylene, glycols, and polyethylene, polypropylene, glycols and glycerine, trimethylol propane, hexanetriol, pentaerythritol, sorbitol and the like. Where available the above mentioned acids may be used in the anhydride form if desired.

In making the polyester-polyols, any of the various polyfunctional acids or anhydrides or mixtures thereof are caused to react with any of the glycols or polyols or mixtures thereof, using a stoichiometric excess of the hydroxyl groups such that the final polyol product contains predominantly hydroxyl end groups. The degree of hydroxyl functionality and the percent hydroxyl is easily varied to provide the desired polyols by technology and techniques which are known to those skilled in the art.

In the art and technology of making polyurethanes, it is also known to employ what is called prepolymer techniques. This is a technique wherein part of the reaction involved in making polyurethane is carried out yielding a prepolymer of increased molecular weight and with either resultant end groups of hydroxyls or isocyanates depending on the stoichiometric used in making this prepolymer. This prepolymer is then used to prepare the final polyurethane product by reacting it with either a polyisocyanate or polyol, depending on, as mentioned above, whether the terminal groups of the prepolymer are hydroxyls or isocyanates, respectively.

Broadly, any of the prior art polyesters, polyisocyanate-modified-polyester prepolymers, polyesteramides, polyisocyanate-modified-polyesteramides, alkylene glycols, polyisocyanate-modified alkylene glycols, polyoxyalkylene glycols, polyisocyanate-modified polyoxyalkylene glycols, etc., having free reactive hydrogens and especially hydroxyl groups may be employed for the production of the polyurethanes or polyisocyanurates described herein.

Examples of isocyanates which can be used include those having two or more isocyanate groups which have heretofore been used for making flexible polyurethane foams. Examples of such isocyanate compounds include aromatic isocyanates, aliphatic isocyanates and alicyclic isocyanates, as well as mixtures of two or more of such isocyanates, and modified isocyanates obtained by the modification of such isocyanates. Specific examples of such isocyanates are toluene diisocyanate, diphenylmethane diisocyanate, polymethylene polyphenylene polyisocyanate (crude MDI), xylylene diisocyanate, isophorone diisocyanate and hexamethylene diisocyanate; and modified products of such polyisocyanates, such as carbodiimide-modified products, biuret-modified products, dimers and trimers. Prepolymers with terminal isocyanate groups obtained from such isocyanates and active hydrogen-containing compounds can also be used.

In one embodiment, the isocyanate index range for flexible polyurethane foams can be from about 130 to about 80, more preferably, from about 120 to about 90 and most preferably from about 115 to about 95.

As the blowing agent in the flexible polyurethane foam-forming composition of the present invention, known blowing agents heretofore used in such compositions are suitably selected according to the properties required of the foamed product.

In the present invention, a cross-linking agent is also used as the case requires.

As the cross-linking agent, a compound having at least two functional groups having active hydrogen, such as hydroxyl groups, primary amino groups or secondary amino groups is preferred. However, in a case where a polyol compound is used as the cross-linking agent, the following is taken into account. Namely, a polyol compound having a hydroxyl value of at least 50 mg KOH/g and more than four functional groups, is considered to be the cross-linking agent, and a polyol which does not satisfy this, is considered to be any one of polyols of the above-mentioned polyol mixture (polyol (1), (2) or other polyol). Further, two or more cross-linking agents may be used together. As specific examples, a polyhydric alcohol such as dextrose, sorbitol or sucrose; a polyol having an alkylene oxide added to a polyhydric alcohol; an amine compound such as monoethanolamine, diethanolamine, ethylenediamine, 3,5-diethyl-2,4 (or 2,6)-diaminotoluene (DETDA), 2-chloro-p-phenylenediamine (CPA), 3,5-bis(methylthio)-2,4 (or 2,6)-diaminotoluene, 1-trifluoromethyl-4-chloro-3,5-diaminobenzene, 2,4-toluenediamine, 2,6-toluenediamine, bis(3,5-dimethyl-4-aminophenyl)methane, 4,4'-diaminodiphenylmethane, m-xylylenediamine, 1,4-diaminohexane, 1,3-bis(aminomethyl)cyclohexane or isophoronediamine; and a compound obtained by adding an alkylene oxide thereto, may, for example, be mentioned.

When the above cross-linking agent is used, even in a case where, for example, a large amount of a blowing agent is used to produce a flexible foam having a low density, the foaming stability will be good, and it will be possible to produce such a flexible foam. Especially when a polyol having a high-molecular weight is used, it is possible to produce a flexible foam having a low density which used to be considered difficult to foam. Further, when the cross-linking agent is used, the durability will be improved, as compared with a case where it is not used. In a case where a polyol having a high-molecular weight is used as in the present invention, the foaming stability can readily be improved particularly when a compound having a relatively high-molecular weight, such as a molecular weight of at least 4000, is used.

Water is a typical example of such a blowing agent; other examples include methylene chloride, n-butane, isobutane, n-pentane, isopentane, dimethyl ether, acetone, carbon dioxide, and the like. Depending on the desired density and other properties of the foamed polyurethane, these and other blowing agents can be used alone or in combinations of two or more in a manner known in the art.

The amount of blowing agent to be used is not particularly limited but will ordinarily range from 0.1 to 20 parts by weight per 100 parts by weight of the polyol component of the foam-forming composition. Preferably, the amount of blowing agent(s) will be such as to provide a foam density of from 0.8 to 2.5 pounds per cubic foot, and preferably from 0.9 to 2.0 pounds per cubic foot.

The polyurethane foam-forming composition herein can preferably contain any of the catalysts, and combination of catalysts, heretofore known or used for the production of polyurethane foams. Examples of useful catalysts include sodium hydroxide, sodium acetate, tertiary amines or materials which generate tertiary amines such as trimethylamine, triethylene diamine, N-methyl morpholine, N,N-dimethyl cyclohexylamine, and N,N-dimethyl aminoethanol. Also applicable are metal compounds such as hydrocarbon tin alkyl carboxylates, dibutyl tin diacetate, dibutyl tin dioctoate dibutyl tin dilaurate and stannous octoate; as well as other compounds intended to promote trimerization of the polyisocyanate such as, 2,4,6-tris(N,N-dimethylamino-methyl)phenol, 1,3,5-tris(N,N-dimethyl-3-aminopropyl)-S-hexahydrotriazine, potassium octoate, potassium acetate and catalysts such as DABCO TMR® and POLYCAT 43®.

Many other kinds of catalysts can be substituted for those listed above, if desired. The amount of catalyst used can advantageously range from 0.05 to 5 weight percent or more based on the total weight of polyol in the foam-forming mixture.

The isocyanate (NCO) index which is applied in making the flexible foam according to the present invention is 95-125 and preferably 100-120. The NCO index which is applied in making the semi-rigid foam according to the present invention is 126-180 and preferably 130-175. The NCO index which is applied in making the rigid foam according to the present invention is 181-350 and preferably 200-300. It is commonly understood that the NCO index of polyurethane foams is from about 80-130 and the NCO index of isocyanurate foams is from about 200-350.

The densities of the flexible foams may range of from 14-80 and preferably 16-55 and most preferably 20-40 kg/m³.

The densities of the semi-rigid foams may range of from 8 to 180 and preferably 8-80 and most preferably 8-48 kg/m³.

The densities of the rigid foams may range of from 8 to 180 and preferably 8-80 and most preferably 8-48 kg/m³.

Surfactants, including organic surfactants and silicone based surfactants, may be added to serve as cell stabilizers. Some representative materials are sold under the designations SF-1109, L-520, L-521 and DC-193, which are, generally, polysiloxane polyoxylalkylene block copolymers. Also included are organic surfactants containing polyoxyethylene-polyoxybutylene block copolymers. It is particularly desirable to employ a minor amount of a surfactant to stabilize the foaming reaction mixture until it cures. Other surfactants that may be useful herein are polyethylene glycol ethers of long-chain alcohols, tertiary amine or alkanolamine salts of long-chain allyl acid sulfate esters, alkylsulfonic esters, alkyl arylsulfonic acids, and combinations thereof. Such surfactants are employed in amounts sufficient to stabilize the foaming reaction against collapse and the formation of large uneven cells. Typically, a surfactant total amount from about 0.2 to about 3 wt %, based on the formulation as a whole, is sufficient for this purpose. However, it may be in some embodiments desirable to include some surfactants, e.g., DABCO DC-5598, available from Air Products and Chemicals, Inc., in a higher amount. In view of this a surfactant may be included in the inventive formulations in any amount ranging from 0 to 6 wt %, based on the polyol component.

Finally, other additives such as fillers and pigments may be included in the polyurethane foam formulations described herein. Such may include, in non-limiting embodiments, barium sulfate, calcium carbonate, graphite, carbon black, titanium dioxide, iron oxide, microspheres, alumina trihydrate, wollastonite, prepared glass fibers (dropped or continuous), polyester fibers, other polymeric fibers, combinations thereof, and the like. Those skilled in the art will be aware without further instruction as to typical and suitable means and methods to adapt the inventive formulations to produce rigid polyurethane foams that, though still falling within the scope of the claims appended hereto, exhibit or benefit from desired property and/or processing modifications.

The polyurethane and/or polyisocyanurate foams described herein, be they be flexible, semi-rigid or rigid, can be utilized in the construction and formation of various articles such as furniture, bedding, automotive seat cushions, panel insulation for wall panel and roof panel construction, and pour-in-place and spray foam insulation for wall panels and roof panels.

Flexible slabstock polyurethane foam can be used for furniture, e.g., upholstered furniture, such as cushions, backs and arms, the automotive industry, such as seat and back cushions for automobiles and trucks, public transport seating, such as busses and airplanes, as well as in any of tractor, bicycle and motorcycle seats, and bedding such as mattresses, as sound insulation materials, automobile interior components such as an arm rest, a steering wheel and a shift lever knob, shoe soles, and sporting goods. Articles such as an automobile steering wheel and a shoe sole which require high wear resistance, for example, are usually made of a molded member covered by a skin on the surface thereof (or on the bottom in the case of shoe), with the inner portion (core) desirably having a lower density for better touch feeling.

Saddles of bicycles are also typically covered by a skin because a high strength is required of the surface with which the body of the rider makes contact and the portion where the saddle is mounted on the bicycle, with the core desirably having a lower density and softness for better ride comfort. In order to finish the painted surface with better appearance, the surface layer is required to have a high density.

Rigid and semi-rigid polyurethane foam has many applications such as an imitation lumber and a structural material. In addition, rigid polyurethane foam can be use in applications such as insulation, construction and packaging; microcellular froth polyurethane foam such as footwear and gasketing; and viscoelastic ("memory") polyurethane foam chemistries, in air filters and as decorative facings for speakers, foam sheets produced on laminating machines with suitable facings or vapor barriers, tank and pipe insulation, applied by sheet, molding and spray techniques, insulation for refrigerators, freezers, water heaters, use in flotation and packaging. The insulation can also comprise window and door insulation.

The insulation can be used in any structural component such as a roof or wall. There is also provided a roof structure comprising joists supporting a structural deck and insulation panels such as those described above positioned above the structural deck, wherein optionally coverboards are positioned thereover, and then a water-proof layer such as built-up roofing or bitumen, or the like is applied thereover, and then there is applied thereover conventional roof coverings such as shingles, tiles, and the like.

There is also provided a wall structure comprising a frame coupled together with structural support members such as wood, steel or concrete beams, a single layer or a plurality of rigid foam insulation boards, e.g., polyisocyanurate foam boards, affixed to the exterior of the frame, for form a continuous outside wall, wherein such coupling and affixing is done with fasteners such as nails, screws, rivets and the like, and wherein there is space formed between the structural support members, and insulation is located within the space so formed, and optionally wall boards are fastened to the interior of the frame to form an internal surface.

EXAMPLES

The viscosity measurements provided herein were conducted at 25° C. by means of a Canon Fenske viscometer.

Preparation Example 1

Preparation of a Mixture of Isomers of 1-(2-hydroxy-propoxy)-3-methyl-phospholene-1-oxides and 1-(1-methyl-2-hydroxyethoxy)-3-methyl-phospholene-1-oxides

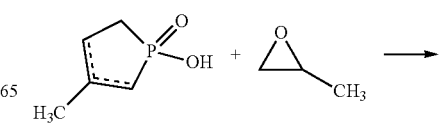

-continued

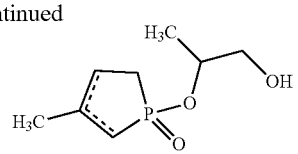

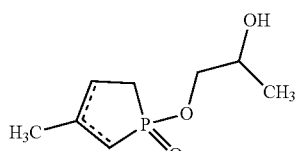

Mixture of isomers

A 2 liter reactor, equipped with a mechanical stirrer, reflux condenser, dropping funnel and thermometer, was charged with an isomeric mixture (150 g, 1.14 mol) composed of 55% 1-hydroxy-3-methyl-3-phospholene-1-oxide and 45% 1-hydroxy-3-methyl-2-phospholene-1-oxide, based on $^{31}$P NMR. Further, propylene oxide (105 g, 1.81 mol) was added to the reactor contents at 60° C. over a period of 2 h. The reaction was exothermic and was kept at 80° C. for an additional 2 h until the conversion of the 1-hydroxy-3-methyl-phospholene-1-oxides was complete (confirmed by $^{31}$P NMR). The propylene oxide was evaporated and the residue was distilled using a wiped film evaporator under vacuum (1 mbar) and the target fraction was collected at a vapor temperature of 110-170° C. A clear colorless liquid (173 g) was obtained. The yield was 80% with respect to the starting 1-hydroxy-3-methyl-phospholene-1-oxides. The product was a mixture of four isomers of hydroxyl-functional 3-methyl-phospholene-1-oxides. $^{31}$P NMR (CDCl$_3$): δ=76.7-78.1 (m). The final product had a phosphorus content of 15.2%, a hydroxyl number of 286 mg KOH/g, an acid number of 0.4 mg KOH/g and a viscosity of 272 cP.

Preparation Example 2

Preparation of a Mixture of Isomers of 1-(2-hydroxy-propoxy)-phospholene-1-oxides and 1-(1-methyl-2-hydroxyethoxy)-phospholene-1-oxides

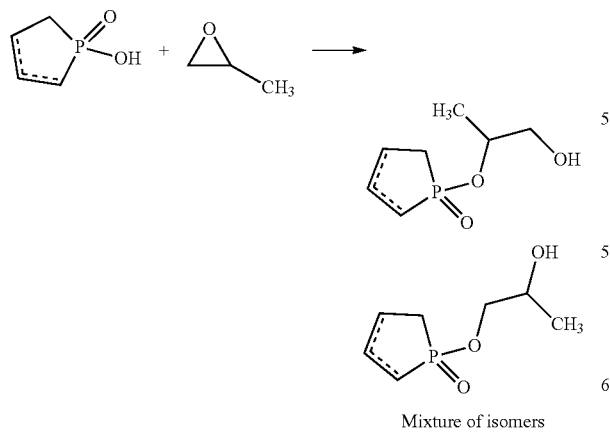

Mixture of isomers

A 2 liter reactor, equipped with a mechanical stirrer, reflux condenser, dropping funnel and thermometer, was charged with an isomeric mixture (199 g, 1.68 mol) composed of 59% 1-hydroxy-3-phospholene-1-oxide and 41% 1-hydroxy-2-phospholene-1-oxide, based on $^{31}$P NMR. Further, propylene oxide (117 g, 2.01 mol) was added to the reactor contents at 60° C. over a period of 2 h. The reaction was exothermic and was kept at 80° C. for an additional 7 h until the conversion of the 1-hydroxy-phospholene-1-oxides was complete (confirmed by $^{31}$P NMR). The propylene oxide was evaporated and the residue was distilled on wiped film evaporator under vacuum (1 mbar) and the target fraction was collected at a vapor temperature of 110-170° C. A clear colorless liquid (255 g) was obtained. The yield was 85% with respect to the starting 1-hydroxy-phospholene-1-oxides. The product was a mixture of four isomers of hydroxyl-functional phospholene-1-oxides. $^{31}$P NMR (CDCl$_3$): δ=77.1-78.8 (m). The final product had a phosphorus content of 16.5%, a hydroxyl number of 321 mg KOH/g, an acid number of 0.4 mg KOH/g and viscosity 172 cP.

Preparation Example 3—Reaction Between 1-hydroxy-3-methyl-phospholene-1-oxides and 1,2-epoxybutane

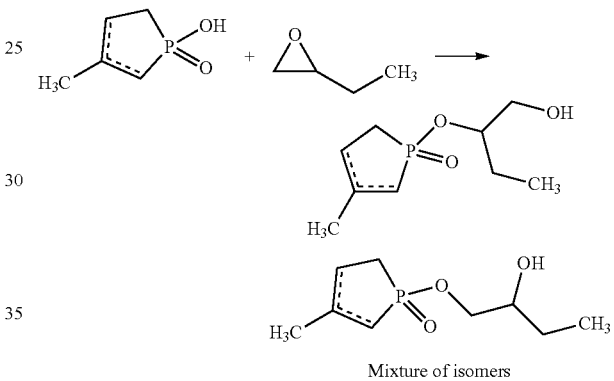

Mixture of isomers

A 100 ml reactor, equipped with a stirrer, reflux condenser, dropping funnel and thermometer, was charged with an isomeric mixture (9.2 g, 0.07 mol) of 37% 1-hydroxy-3-methyl-3-phospholene-1-oxide and 63% 1-hydroxy-3-methyl-2-phospholene-1-oxide, based on $^{31}$P NMR. 1,2-epoxybutane (12 g, 0.17 mol) was then added dropwise to the reactor contents at 25° C. over a period of 15 min. The reaction was exothermic and the mixture was held at 80° C. for an additional 5 h until the conversion of the 1-hydroxy-3-methyl-phospholene-1-oxides was complete (confirmed by $^{31}$P NMR). The excess 1,2-epoxybutane was evaporated at 95° C. under vacuum (~1 mbar). A clear colorless liquid (14.3 g) was obtained. The product was a mixture of four isomers of hydroxyl-functional 3-methyl-phospholene-1-oxides. $^{31}$P NMR (CDCl$_3$): δ=76.1-77.2 (m). The final product had an acid number of 7.5 mg KOH/g.

Preparation Example 4—Reaction Between 1-hydroxy-3-methyl-phospholene-1-oxides and Trimethylolpropane Triglycidyl Ether

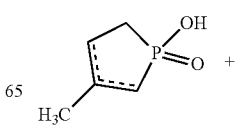

-continued

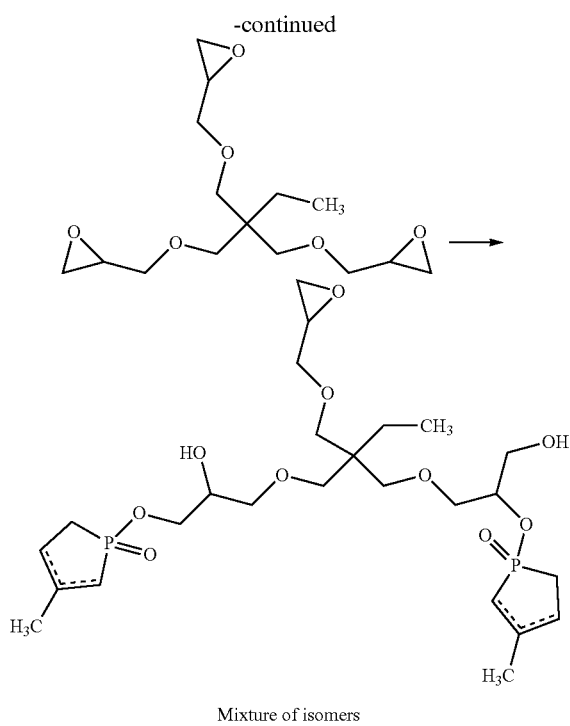

Mixture of isomers

A 1 liter reactor, equipped with a mechanical stirrer, reflux condenser, dropping funnel and thermometer, was charged with an isomeric mixture (84.7 g, 0.64 mol) of 1-hydroxy-3-methyl-phospholene-1-oxides and trimethylolpropane triglycidyl ether (96 g, 0.318 mol). The reaction mixture was held at 60° C. for 12 h until the conversion of the 1-hydroxy-3-methyl-phospholene-1-oxides was complete (confirmed by $^{31}$P NMR). 300 g DCM was then added. The solution was washed with 200 g aq. 2% $Na_2CO_3$ and twice with 150 g distilled water. Evaporation of the DCM from the washed product resulted in a very viscous liquid (112 g). $^{31}$P-NMR (CDCl$_3$): δ=83.6-85.3 (m). The final product had a phosphorus content of 9.2%, a hydroxyl number of 251 mg KOH/g and an acid number of 0.18 mg KOH/g.

Preparation Example 5—Reaction Between 1-hydroxy-3-methyl-phospholene-1-oxides and Styrene Oxide

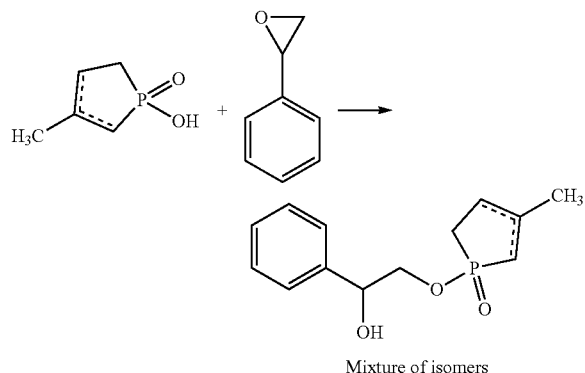

Mixture of isomers

A 1 liter reactor, equipped with a mechanical stirrer, reflux condenser, dropping funnel and thermometer, was charged with an isomeric mixture (124.1 g, 0.94 mol) of 1-hydroxy-3-methyl-phospholene-1-oxides, styrene oxide (188.5 g, 1.57 mol) and 100 ml toluene. The reaction was exothermic and the mixture was held at 50° C. for 12 h until the conversion of the 1-hydroxy-3-methyl-phospholene-1-oxides was nearly complete (confirmed by $^{31}$P NMR). The toluene and excess styrene oxide were evaporated at 95° C. under vacuum (~1 mbar). A clear colorless liquid (245 g) was obtained. The product was a mixture of four isomers of hydroxyl-functional 3-methyl-phospholene-1-oxides. $^{31}$P-NMR (CDCl$_3$): δ=73.7-75.7 (m).

Preparation Example 6—Reaction Between 1-hydroxy-3-methyl-phospholene-1-oxides and Epoxidized Soy Bean Oil (ESBO)

A 100 ml reactor, equipped with a magnetic stirrer, thermometer and reflux condenser, was charged with an isomeric mixture (15.4 g, 0.11 mol) of 1-hydroxy-3-methyl-phospholene-1-oxides, ESBO (19.4 g, 0.0194 mol) and 20 ml toluene. The reaction mixture was held at 60° C. for 18 h until the conversion of the 1-hydroxy-3-methyl-phospholene-1-oxides was complete (confirmed by $^{31}$P NMR). The reaction mixture was washed with aq. 2% NaOH (20 g) and twice with 30 g distilled water. The toluene was evaporated at 95° C. under vacuum (~1 mbar). A waxy colorless liquid (34 g) was obtained. $^{31}$P-NMR (CDCl$_3$): δ=79.75-80.9 (m).

Preparation Example 7—Reaction Between 1-chloro-3-methyl-phospholene-1-oxides and Ethylene Glycol Monosodium Salt

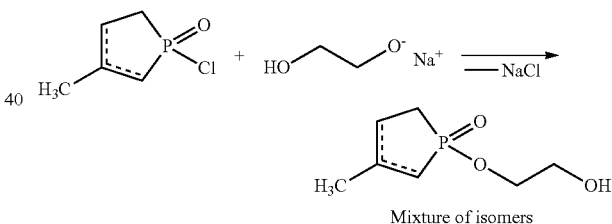

Mixture of isomers

A 2 liter reactor, equipped with a mechanical stirrer, thermometer, Dean-Stark trap and reflux condenser with a nitrogen inlet, was charged with ethylene glycol (1004 g, 16.2 mol), NaOH (114.3 g, 2.85 mol) and 300 ml toluene. The solution was heated at reflux for 1.5 h, during which time water (51 g) distilled off. The solution was then cooled under nitrogen to 30° C. and an isomeric mixture of 1-chloro-3-methyl-3-phospholene-1-oxide and 1-chloro-3-methyl-2-phospholene-1-oxide (406.4 g, 2.7 mol) was added dropwise over a period of 2 h. An exotherm was observed. The temperature was maintained at 65° C. for an additional 2 h. Subsequently, the toluene and the excess ethylene glycol were distilled off under vacuum (~1 mbar). Dichloromethane (200 ml) was added at ambient temperature, and the mixture was filtered to remove the NaCl formed. The product was further distilled under vacuum (~1 mbar) and the target fraction was collected at a vapor temperature of 103-166° C. A clear yellowish liquid (309 g) was obtained. The yield was 65% with respect to the starting 1-chloro-3-methyl-phospholene-1-oxides. The product was a mixture of two isomers of hydroxyl-functional 3-methyl-phospholene- 1-oxides. $^{31}$P-NMR (CDCl$_3$): δ=78.9-79.1 (m). The final product had a phosphorus content of 15.3%, and an acid number of 1.28 mg KOH/g.

Preparation Example 8—Reaction Between 1-chloro-3-methyl-phospholene-1-oxides and Diethylene Glycol Monosodium Salt

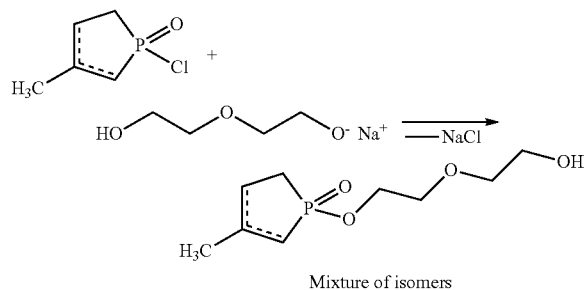

Mixture of isomers

A 1 liter reactor, equipped with a mechanical stirrer, thermometer, Dean-Stark trap, and reflux condenser with a nitrogen inlet, was charged with diethylene glycol (440 g, 4.15 mol), NaOH (27.7 g, 0.69 mol) and 300 ml toluene. The solution was heated at reflux for 1.5 h, during which time water (12 g) distilled off. Then, the solution was cooled under nitrogen to 30° C. and an isomeric mixture of 1-chloro-3-methyl-3-phospholene-1-oxide and 1-chloro-3-methyl-2-phospholene-1-oxide (98.12 g, 0.65 mol) was added dropwise over a period of 2 h. An exotherm was observed. The temperature was maintained at 65° C. for an additional 2 h. Subsequently, the toluene and the excess diethylene glycol were distilled off under vacuum (~1 mbar). Dichloromethane (200 ml) was added at ambient temperature and the mixture was filtered to remove the NaCl formed. The product was further distilled under vacuum (~1 mbar) to give a clear yellowish liquid (86 g). The yield was 60% with respect to the starting 1-chloro-3-methyl-phospholene-1-oxides. The product was a mixture of two isomers of hydroxyl-functional 3-methyl-phospholene-1-oxides. $^{31}$P-NMR (CDCl$_3$): δ=77.36-78.3 (m). The final product had a phosphorus content of 13.5%, a hydroxyl number of 267 mg KOH/g and an acid number of 1.4 mg KOH/g.

Preparation Example 9—Reaction Between 1-chloro-3-methyl-phospholene-1-oxides and an Aliphatic Trifunctional Polyol with Mw 500

A 1 liter reactor, equipped with a mechanical stirrer, thermometer, dropping funnel, and reflux condenser, was charged with an aliphatic polyol (109.9 g, 0.22 mol), triethylamine (70.7 g, 0.7 mol) and 500 ml anhydrous DCM. The mixture was cooled to 5° C. and an isomeric mixture of 1-chloro-3-methyl-3-phospholene-1-oxide and 1-chloro-3-methyl-2-phospholene-1-oxide (99.3 g, 0.66 mol) was added dropwise, while maintaining the temperature below 10° C. After the addition was complete, the reaction mixture was heated at reflux for 3 h. The final mixture was filtered, then washed with aq. 0.5% NaOH (500 g) and water (400 g). The washed organic phase was evaporated under vacuum at 95° C. to give 142 g of a yellowish waxy liquid. The yield was 76% with respect to the starting 1-chloro-3-methyl-phospholene-1-oxides.

$^{31}$P-NMR (CDCl$_3$): δ=76.5-77.0 (m). The final product had a phosphorous content of 9.7%, a hydroxyl number of 30.3 mg KOH/g and an acid number of 0.3 mg KOH/g sample.

Preparation Example 10—Reaction Between 1-chloro-3-methyl-phospholene-1-oxides and an Aliphatic Trifunctional Polyol with Mw~300

A 0.5 liter reactor, equipped with a mechanical stirrer, thermocouple, N$_2$ inlet, dropping funnel, and reflux condenser, was charged with an dried aliphatic polyol (60 g, 0.2 mol), 75.7 g of triethylamine and 250 ml anhydrous DCM. The mixture was cooled to 2° C. and an isomeric mixture of 1-chloro-3-methyl-3-phospholene-1-oxide and 1-chloro-3-methyl-2-phospholene-1-oxide (103.5 g, 0.69 mol) was added dropwise over ~2 h, while maintaining the temperature below 5° C. After the addition was completed, the reaction mixture was heated at reflux for 2 h. The solid was filtered off, solution was washed with water, Na$_2$CO$_3$ 16% solution and with water again to give pH=7. The product (101.9 g, 79% of yield) was obtained after DCM evaporation under reduced pressure. The final product had a phosphorous content of 13.4%, a hydroxyl number of 30.1 mg KOH/g and an acid number of 0.3 mg KOH/g sample.

The application of the new compounds of the present invention is demonstrated through their use as flame retardants in standard formulations for rigid polyurethane foams (Application Example 1) and for rigid polyisocyanurate foams that have an MDI Index of 300% (Application Example 2). In addition to the flame retardant, the following components were used in the preparation of the foams:

Polyol Components Used for Spray Foam Production (101% Index):

1. Terate HT5100—Aromatic Polyester polyols having a hydroxyl value of 295 mg KOH/g available from Invista.

2. JEFFOL R 425X—Polyether polyol having a hydroxyl value of 425 mg KOH/g available from Huntsman.

Polyol Components Used for PIR (300% Index) Production:

Kosa Terate 2541—Aromatic Polyester polyols having a hydroxyl value of 234 mg KOH/g and is available from Invista.

| Ancillary chemicals | |
|---|---|
| Polycat 77 | N-[3-(Dimethylamino)propyl]-N,N',N'-trimethyl-propane-1,3-diamine available from Air Products. |
| DABCO BL-11 | N,N,N',N'-Tetramethyl-2,2'oxybis(ethylamine), amine catalyst available from Air Products |
| DC 193 | Silicone surfactant available from Air Products |
| Bicat 8210 | Bismuth tris(2-ethylhexanoate) available from Shepard Chemical |
| DMCHA | Dimethylcyclohexylamine |
| Dabco TMR30 | 2,4,6-Tris(dimethylaminomethyl) phenol - Amine catalyst available from Air Products |
| Tegostab B8460 | Polyether-modified polysiloxane surfactant available from Evonik |
| Kosmos 75 | Potassium-2-ethyl hexanoate catalyst available from Evonik |
| HFC-245fa | Blowing agent available from Honeywell |
| Pentane | Blowing agent |
| Isocyanate MDI | Polymeric diphenylmethane diisocyanate available from Huntsman |

Application Example 1

Process for Preparing Spray Formulation Polyurethane Foams Using the Flame Retardant Compositions The procedure for the foam preparation was as follows:

The polyols, water, surfactant, flame retardant (abbreviated "FR" in the tables below) and catalysts were weighed, placed in a mixing beaker and mixed to form a homogeneous solution. To this solution was added HFC-245fa, and after additional mixing, while maintaining its weight against vaporization, the polymeric isocyanate was added. The mixture was briefly stirred at 20° C. at 5500 rpm for 3 sec and poured into a cardboard cake-box. The foam thus formed was held for at least 24 h at room temperature and then removed from the box and cut into test specimens with a saw. The samples were then tested for flammability according to the DIN 4102 B2 test procedure (a flame height of 15.0 cm or less means that the foam has passed the test). Table 1 presents the ingredients and parameters for the foam preparation and the results of the tests.

TABLE 1

| Spray formulation system (mixed at 20° C.) | |
| --- | --- |
| Composition (g) | Example 1 |
| Terate HT5100 | 48 |
| Jeffol 4 425X | 25 |
| FR of Example (F-3014/FR-513/Preparation Example 1 30/30/40%) | 12 |
| Polycat 77 | 1.0 |
| DABCO BL-11 | 1.0 |
| DC193 | 1.0 |
| Bicate 8210 | 0.6 |
| Water | 2.5 |
| HFC-245fa | 6.8 |
| Total | 97.9 |
| Isocyanate, g (Urestyl-10) | 104.5 |
| MDI Index, % | 101 |
| Mix time, sec (6000 rpm) | 3 |
| Rise time, sec | 11 |
| Br, P content in polyol mixture, wt % | 4.92; 0.73 |
| Br, P content in foam, wt % | 2.42 |
| Foam density kg/m$^3$ (lbs/ft$^3$) | 28.0 (1.75) |
| Flame height, cm (DIN 4102) | 14.0 |

Application Example 2

Process for Preparing Rigid Polyisocyanurate Foams (PIR) with MDI Index 300% Using the Flame Retardant Compositions The procedure for the foam preparation was as follows:

The polyols, water, surfactant, flame retardant and catalysts were weighed, placed in a mixing beaker, and mixed to form a homogeneous solution. To this solution was added pentane, and after further mixing, the polymeric isocyanate. The mixture was then stirred at 20° C. at 3500 rpm for 6 sec and poured into a cardboard cake-box. The foam thus formed was held for at least 24 h at room temperature and then removed from the beaker and cut into test specimens with a saw. The samples were then tested for flammability according to the DIN 4102 B2 test procedure (a flame height of 15.0 cm or less means that the foam has passed the test). Table 2 summarizes the ingredients and parameters for the foam preparation and the results of the testing of the foams.

TABLE 2

| PIR formulation system (mixed at 20° C.) | |
| --- | --- |
| Composition (g) | Example 2 |
| Terate 2541 | 100 |
| FR of Preparation Example 1 | 15 |
| DMCHA | 1.5 |
| DABCO TMR30 | 1.0 |
| Tegostab B8460 | 1.5 |
| Kosmos 75 | 1.0 |
| Water | 1.0 |
| Pentane | 13 |
| Total | 134 |
| Isocyanate, g | 250.8 |
| MDI Index, % | 300 |
| Mix time, sec | 6 |
| Cream time, sec | 11 |
| Gel time, sec | 40 |
| P content in polyol mixture, wt % | 1.68 |
| P content in foam, wt % | 0.58 |
| Foam density kg/m$^3$ (lbs/ft$^3$) | 29.9 (1.87) |
| Flame height, cm (DIN 4102) | 13.8 |

Application Example 3

The application of the new compounds of the present invention is demonstrated through their use as flame retardants in standard formulations for flexible polyurethane foams (Application Example 3). In addition to the flame retardant, the following components were used in the preparation of the foams:

| Materials | Manufacturer |
| --- | --- |
| Voranol 8136 Polyether Polyol | Dow |
| Desmophen 2200B Polyester Polyol | Covestro |
| Niax A-1 amine catalyst | Momentive |
| Niax C-131 NPF | Momentive |
| Niax DMP | Momentive |
| Niax L-537XF | Momentive |
| Dabco 33 LV amine catalyst | Air Products |
| T-10 tin catalyst | Air products |
| B-8232 silicone surfactant | Evonik |
| TDI 80 | Bayer Materials |
| TDI 65 | Bayer Materials |
| Hydroxyl-functional phospholene-1-oxide of Preparation Examples 1 and 2. | ICL |

Process for Preparing Flexible Polyurethane Foams

Foam samples were prepared by mixing the polyol and hydroxyl-functional phospholene-1-oxide of Preparation Examples 1 and 2 separately. The remaining components of the formulation, including water, amine catalyst, silicone surfactant and tin catalyst except for the isocyanate, were added and stirred into the polyol/hydroxyl-functional phospholene-1-oxide mixture at 2500 rpm for 30 seconds for polyether foam, 1000 rpm for 60 seconds for polyester foam Immediately after addition and incorporation of the isocyanate into the reaction mixture with vigorous stirring, the complete reaction mixture was then poured into an 8×8×5" (20×20×20 cm) box and allowed to rise fully. The box was then placed in a ventilated hood for 24 hours curing at room temperature. The top and bottom 0.5" of the foam sample was removed, as well as the paper lining sides of the foam. Samples were then cut and tested for flammability, including Federal Motor Vehicle Safety Standard No. 302 (FMVSS 302), California Technical Bulletin 117 (CAL 117, 2000); volatilization per DIN 75201 Gravimetric and VDA 277. Scorch was done by measuring Delta E, the color differences between foam samples and a color standard. Foam samples were placed in a 180° C. oven for 30, 60, 90 and 120 minutes. Delta E was then measured at the above time intervals. Higher value in Delta E means higher discoloration.

Tables 3 and 4 below and the above table and explanation in Application Example 3 present the ingredients and parameters for the foam preparation and the results of the tests. FIGS. 1 and 2 below present the scorch/discoloration evaluation results of the foam.

TABLE 3

Polyether flexible foam formulation system and test results

| | Example 1 | Example 2 | Example 3 | Example 4 | Example 5 | Example 6 | Example 7 |
|---|---|---|---|---|---|---|---|
| Formulation (parts by weight) | | | | | | | |
| Polyol Voranol 8136 | 100 | 100 | 100 | 100 | 100 | 100 | 100 |
| Flame Retardant | — | Fyrol FR-2 | From Prep. Ex. 1 | — | Fyrol FR-2 | From Prep. Ex. 1 | From Prep. Ex. 2 |
| FR Loading | — | 8.00 | 4.00 | — | 12.00 | 6.00 | 4.00 |
| Water | 3.55 | 3.55 | 3.3 | 4.5 | 4.5 | 4.3 | 3.3 |
| Niax A-1 | 0.06 | 0.06 | 0.06 | 0.06 | 0.06 | 0.06 | 0.06 |
| Dabco 33LV | 0.19 | 0.19 | 0.19 | 0.19 | 0.19 | 0.19 | 0.19 |
| Tegostab B8232 | 0.70 | 0.70 | 0.70 | 0.70 | 0.70 | 0.70 | 0.70 |
| Stannous Octoate T-10 | 0.32 | 0.44 | 0.13 | 0.34 | 0.41 | 0.09 | 0.13 |
| TDI Index | <110> | <110> | <110> | <110> | <110> | <110> | <110> |
| Physical Properties | | | | | | | |
| Density (pcf) | 1.80 | 1.80 | 1.80 | 1.50 | 1.60 | 1.50 | 1.80 |
| Air Flow (scfm) | 3.70 | 3.30 | 3.50 | 4.70 | 4.60 | 4.70 | 3.60 |
| Wt % P in Foam | — | 0.37 | 0.41 | — | 0.52 | 0.55 | 0.45 |
| Flame/Emission Test | | | | | | | |
| FMVSS 302 | Fail | SE | SE | Fail | SE | SE | SE/NBR |
| CAL 117 (Section A, 2000) Normal Conditioning | Fail | Pass | Pass | Fail | Pass | Pass | N/A |
| CAL 117 (Section A, 2000) Dry Heat conditioning | Fail | Pass | Pass | Fail | Pass | Pass | N/A |
| CAL 117 Smoldering (Section D, 2000) | Fail | Fail | Pass | N/A | N/A | N/A | N/A |
| Fogging DIN-75201 Gravimetric (mg) | 0.95 | 1.34 | 0.89 | 0.81 | 1.29 | 0.79 | N/A |
| VDA 277 Total Carbon Emission (μg C/g) | 74.8 | 141.5 | 68.0 | 38.4 | 59.4 | 36.1 | N/A |

TABLE 4

Polyester flexible foam formulation system and test results

| Formulation | Example 8 | Example 9 | Example 10 |
|---|---|---|---|
| Desmophen 2200B | 100 | 100 | 100 |
| Flame Retardant | — | Fyrol A300-TB | Preparation Example 1 |
| FR Loading | — | 7 | 3 |
| Water | 4.0 | 4.0 | 4.0 |
| Niax C-131NPF | 1.1 | 1.1 | 1.1 |
| Niax DMP | 0.2 | 0.2 | 0.2 |
| Niax L-537XF | 1.3 | 1.3 | 1.3 |
| TDI Index (40% TD80 60% TD65) | <98> | <98> | <98> |
| Physical Properties | | | |
| Density (pcf) | 1.80 | 1.90 | 1.80 |
| Air Flow (scfm) | 1.10 | 1.00 | 0.90 |
| wt % P in Foam | — | 0.33 | 0.30 |
| Flame/Emission Test | | | |
| FMVSS 302 | Fail | SE | SE |
| FMVSS 302 Humid aged (115° C. 100% RH 3 h) | Fail | SE | SE |
| Fogging DIN-75201 Gravimetric (mg) | 5.20 | 5.66 | 5.49 |

Application Example 4

Process for preparing Low Density (0.5 lbs./ft$^3$) spray formulation polyurethane foams using the flame retardant compositions based on hydroxyl-functional phospholene-1-oxide of Preparation Example 8.

The procedure for the foam preparation was as follows:

The polyols, water, surfactant, flame retardant (abbreviated "FR" in the tables below) and catalysts were weighed, placed in a mixing beaker and mixed to form a homogeneous solution. To this solution the polymeric isocyanate was added. The mixture was briefly stirred at room temperature at 5500 rpm for 3 seconds and poured into a 1 liter cardboard cup. The foam thus formed was held for at least 24 hours at room temperature and then removed from the box and cut into test specimens with a saw. The samples were then tested for flammability according to the Oxygen Index test procedure under ASTM d. Table 5 presents the ingredients and parameters for the foam preparation and the results of the tests.

TABLE 5

Low-Density Spray formulation system

| Composition (g) | Example 1 |
|---|---|
| Multranol 3901 (OH No. 28) available from Covestro | 28 |
| Jeffol SG 360 (OH No. 360) available from Huntsman | 10 |
| Hydroxyl-functional phospholene-1-oxide of Preparation Example 8 | 25 |
| Surfonic N-95 (OH No. 88) surfactant available from Huntsman | 12.0 |
| DABCO BL-19 Amine Catalyst available from Air Products | 2.0 |
| Tegostab B-1048 Surfactant available from Evonik | 2.0 |
| Dabco T Amine Catalyst available from Air Products | 4.0 |
| Water | 20.0 |
| Total | 103 |
| Isocyanate, g (Rubinate M eq. wt. 135 available from Huntsman) | 128.4 |
| MDI Index, % | 39 |
| Mix time, sec (5500 rpm) | 3 |
| Rise time, sec | 12 |
| P content in polyol mixture, wt % | 3.28 |
| P content in foam, wt % | 1.6-1.7 |
| Foam density kg/m³ (lbs/ft³) | 9.0 (0.56) |
| LOI, % (ASTM D 2863) | 22.0 |

The invention claimed is:

1. A rigid or semi-rigid polyurethane or polyisocyanurate comprising a hydroxyl-functional phospholene-1-oxide compound of the formula (I-A):

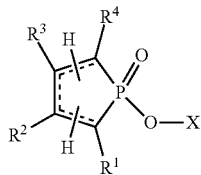

(I-A)

wherein:
the dashed line indicates a double bond located between the carbon atom at position 3 and one of the carbon atoms at positions 2 and 4, provided that each of the two ring carbon atoms which are not part of the double bond are each bonded to one of the two hydrogen atoms shown in the structural formula (I-A);

$R^2$, $R^3$ and $R^4$ are independently selected from H, a linear or branched alkyl group containing from 1 to 4 carbon atoms, or chlorine; and, X is either ------ $(Z)_k$—$R^7$ or

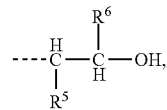

and when X is ------ $(Z)_k$—$R^7$, Z is —(Y—O)$_n$—, wherein Y is a linear or branched alkylene group containing from 2 to 8 carbon atoms and n represents an integer from 1 to 20;

k may be 0 or 1;

$R^7$ is selected from hydrogen, a hydroxy-terminated linear or branched alkylene group containing from 2 to about 8 carbon atoms; and, provided that when k is zero, $R^7$ is the hydroxy-terminated linear or branched alkylene group and when k is 1, $R^7$ is hydrogen, and when X is

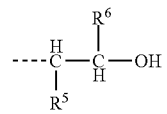

$R^5$ and $R^6$ are each independently selected from H, a linear or branched alkyl group containing from 1 to 8 carbon atoms, a linear or branched alkenyl group containing from 2 to 8 carbon atoms, a hydroxyalkyl group containing from 2 to 4 carbon atoms, a halo-substituted alkyl group containing from 1 to 8 carbon atoms, an alkoxy group containing from 1 to 8 carbon atoms, an aryl group containing from 6 to 12 carbon atoms and an alkylaryl group containing from 7 to 16 carbon atoms, or $R^5$ and $R^6$ are bonded to each other to form a cycloalkyl group containing from 5 to about 8 carbon atoms.

2. The rigid or semi-rigid polyurethane or polyisocyanurate of claim 1 wherein the hydroxyl-functional phospholene-1-oxide compound has the formula (I-A-1):

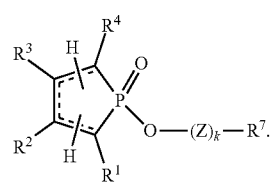

(I-A-1)

3. The rigid or semi-rigid polyurethane or polyisocyanurate of claim 1 wherein the hydroxyl-functional phospholene-1-oxide compound has the formula (I-A-2):

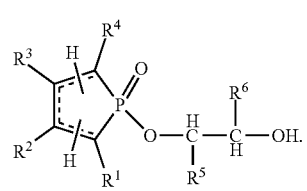

(I-A-2)

4. A rigid or semi-rigid polyurethane or polyisocyanurate comprising a phosphorus-containing polyol reaction product of the partial phosphorylation of a polyalcohol, which comprises at least one phosphorus-containing group, of the formula (I-B):

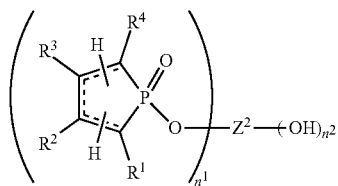

(I-B)

wherein:
the dashed line indicates a double bond located between the carbon atom at position 3 and one of the carbon atoms at positions 2 and 4, provided that each of the two ring carbon atoms which are not part of the double bond are each bonded to one of the two hydrogen atoms shown in the structural formula (I-B);
$R^1$, $R^2$, $R^3$ and $R^4$ are independently selected from H, a linear or branched alkyl group containing from 1 to 4 carbon atoms, or chlorine,
each of $n^1$ and $n^2$ is an integer equal to or greater than 1, with $n^1+n^2$ being equal to or greater than 3, and
$Z^2$ is a moiety derived from a branched polyol which has a valence of $n^1+n^2$, and is of the general formula:

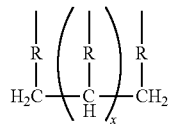

wherein R is selected from the group consisting of:

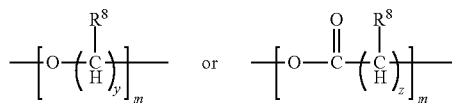

and where each $R^8$ independently is H or is an alkyl of from 1 to 4 carbon atoms, x is $\geq 1$, y is 2 or 3; z is an integer of from 2 to 5; and, $m \geq 1$.

5. The rigid or semi-rigid isocyanurate of claim 1 wherein the isocyanurate is any one of a foam, a coating, an adhesive and an elastomer.

6. The rigid or semi-rigid polyurethane or polyisocyanurate of claim 1 further comprising at least one halogenated or non-halogenated flame retardant.

7. The rigid or semi-rigid polyurethane or polyisocyanurate of claim 6, wherein the halogenated flame retardant is tribromoneopentyl alcohol of formula (VII):

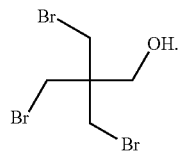

(VII)

8. The rigid or semi-rigid polyurethane or polyisocyanurate of claim 6, wherein the halogenated flame retardant is at least one tribromophenol-terminated compound of formula (VI):

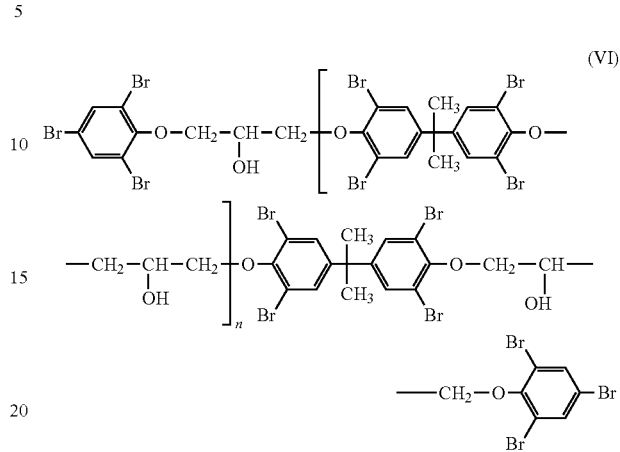

(VI)

wherein n, the degree of polymerization, is an integer in the range of 0 to 5.

9. The rigid or semi-rigid polyurethane or polyisocyanurate of claim 6, wherein the halogenated flame retardant is a brominated flame retardant selected from the group consisting of brominated bisphenol A compounds, brominated bisphenol S compounds, brominated bisphenol F compounds, brominated bisphenol A carbonate oligomers, brominated bisphenol A epoxy resins, end-capped brominated bisphenol A epoxy resin, aliphatic brominated alcohols and glycols, dibromoneopentyl glycol, brominated phthalates and tetrabromophthalate diols, brominated phosphates, brominated phenols, brominated phthalic acids, and combinations thereof.

10. An application selected from the group consisting of imitation lumber, insulation, packaging, footwear, gasketing, viscoelastic ("memory") foam chemistries, air filter and decorative facings for speakers, foam sheets produced on laminating machines, facings or vapor barriers, and flotation applications which comprises the rigid or semi-rigid polyurethane or polyisocyanurate of claim 1.

11. The insulation of claim 10 which is selected from, tank and pipe insulation, applied by sheet, molding and spray techniques, insulation for refrigerators, insulation for freezers, insulation for water heaters, panel insulation for roofs, panel insulation for walls, ceiling insulation, floor insulation, and window and door insulation.

12. A roof structure comprising the panel insulation for roofs of claim 11.

13. A wall structure comprising the panel insulation for walls of claim 11.

14. A rigid or semi-rigid polyurethane or polyisocyanurate foam comprising the reaction product of a polyol, a polyisocyanate and a hydroxyl-functional phospholene-1-oxide compound of the formula (I-A):

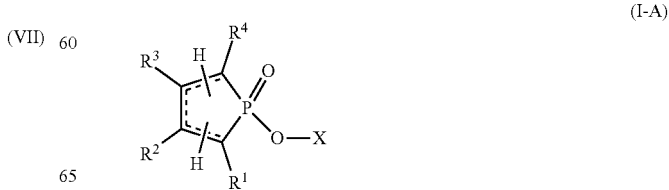

(I-A)

wherein:
the dashed line indicates a double bond located between the carbon atom at position 3 and one of the carbon atoms at positions 2 and 4, provided that each of the two ring carbon atoms which are not part of the double bond are each bonded to one of the two hydrogen atoms shown in the structural formula (I-A);
$R^1$, $R^2$, $R^3$ and $R^4$ are independently selected from H, a linear or branched alkyl group containing from 1 to 4 carbon atoms, or chlorine; and,
X is either - - - - - - $(Z)_k$—$R^7$ or

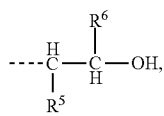

and when X is - - - - - - $(Z)_k$—$R^7$, Z is —$(Y-O)_n$—, wherein Y is a linear or branched alkylene group containing from 2 to 8 carbon atoms and n represents an integer from 1 to 20;
k may be 0 or 1;
$R^7$ is selected from hydrogen, a hydroxy-terminated linear or branched alkylene group containing from 2 to about 8 carbon atoms; and,
provided that when k is zero, $R^7$ is the hydroxy-terminated linear or branched alkylene group and when k is 1, $R^7$ is hydrogen, and
when X is

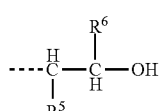

$R^5$ and $R^6$ are each independently selected from H, a linear or branched alkyl group containing from 1 to 8 carbon atoms, a linear or branched alkenyl group containing from 2 to 8 carbon atoms, a hydroxyalkyl group containing from 2 to 4 carbon atoms, a halo-substituted alkyl group containing from 1 to 8 carbon atoms, an alkoxy group containing from 1 to 8 carbon atoms, an aryl group containing from 6 to 12 carbon atoms and an alkylaryl group containing from 7 to 16 carbon atoms, or $R^5$ and $R^6$ are bonded to each other to form a cycloalkyl group containing from 5 to about 8 carbon atoms.

15. The rigid or semi-rigid polyurethane or polyisocyanurate foam of claim 14 wherein the hydroxyl-functional phospholene-1-oxide compound has the formula (I-A-1):

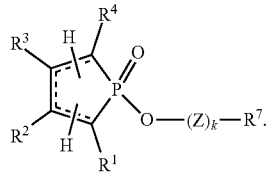

(I-A-1)

16. The rigid or semi-rigid polyurethane or polyisocyanurate foam of claim 14 wherein the hydroxyl-functional phospholene-1-oxide compound has the formula (I-A-2):

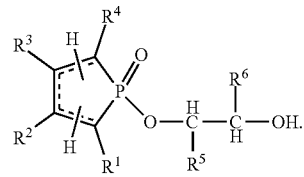

(I-A-2)

17. A rigid or semi-rigid polyurethane or polyisocyanurate foam comprising the reaction product of a polyol, a polyisocyanate and a phosphorus-containing polyol reaction product of the partial phosphorylation of a polyalcohol, which comprises at least one phosphorus-containing group, of the formula (I-B):

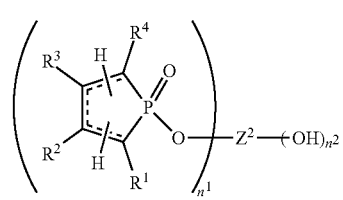

(I-B)

wherein:
the dashed line indicates a double bond located between the carbon atom at position 3 and one of the carbon atoms at positions 2 and 4, provided that each of the two ring carbon atoms which are not part of the double bond are each bonded to one of the two hydrogen atoms shown in the structural formula (I-B);
$R^1$, $R^2$, $R^3$ and $R^4$ are independently selected from H, a linear or branched alkyl group containing from 1 to 4 carbon atoms, or chlorine,
each of $n^1$ and $n^2$ is an integer equal to or greater than 1, with $n^1+n^2$ being equal to or greater than 3, and
$Z^2$ is a moiety derived from a branched polyol which has a valence of $n^1+n^2$, and is of the general formula:

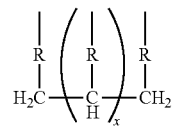

wherein R is selected from the group consisting of:

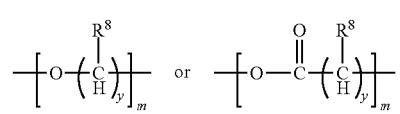

and where each $R^8$ independently is H or is an alkyl of from 1 to 4 carbon atoms, x is $\geq 1$, y is 2 or 3; z is an integer of from 2 to 5; and, m≥1.

* * * * *